US006937665B1

(12) United States Patent
Vandenameele

(10) Patent No.: US 6,937,665 B1
(45) Date of Patent: Aug. 30, 2005

(54) METHOD AND APPARATUS FOR MULTI-USER TRANSMISSION

(75) Inventor: Patrick Vandenameele, Leuven (BE)

(73) Assignee: Interuniversitaire Micron Elektronica Centrum, Leuven (BE)

( * ) Notice: Subject to any disclaimer, the term of this patent is extended or adjusted under 35 U.S.C. 154(b) by 0 days.

(21) Appl. No.: 09/552,150

(22) Filed: Apr. 18, 2000

Related U.S. Application Data

(60) Provisional application No. 60/130,071, filed on Apr. 19, 1999.

(51) Int. Cl.[7] .......................... H04L 27/28; H03D 1/00; H04J 11/00
(52) U.S. Cl. ....................... 375/260; 375/340; 370/210
(58) Field of Search ................................ 375/260, 342, 375/347, 340, 299; 370/308, 342, 340

(56) References Cited

U.S. PATENT DOCUMENTS

| | | | | |
|---|---|---|---|---|
| 5,612,978 A | * | 3/1997 | Blanchard et al. | 375/350 |
| 5,706,275 A | * | 1/1998 | Zhengdi | 370/204 |
| 5,771,224 A | * | 6/1998 | Seki et al. | 370/206 |
| 5,838,740 A | * | 11/1998 | Kallman et al. | 375/346 |
| 5,864,548 A | * | 1/1999 | Liu | 370/320 |
| 6,122,260 A | * | 9/2000 | Liu et al. | 370/280 |
| 6,128,276 A | * | 10/2000 | Agee | 370/208 |
| 6,137,843 A | * | 10/2000 | Chennakeshu et al. | 375/340 |
| 6,144,711 A | * | 11/2000 | Raleigh et al. | 375/347 |
| 6,188,717 B1 | * | 2/2001 | Kaiser et al. | 375/148 |
| 6,219,341 B1 | * | 4/2001 | Varanasi | 370/252 |
| 6,232,918 B1 | * | 5/2001 | Wax et al. | 342/360 |
| 6,307,851 B1 | * | 10/2001 | Jung et al. | 370/342 |
| 6,452,981 B1 | * | 9/2002 | Raleigh et al. | 375/299 |
| 6,452,987 B1 | * | 9/2002 | Larsson et al. | 375/345 |

FOREIGN PATENT DOCUMENTS

| | | | | |
|---|---|---|---|---|
| EP | 0975101 A2 | | 7/1999 | |
| EP | 0 975 101 A2 | * | 1/2000 | ............ H04B 7/08 |
| GB | 2 324 932 A | * | 11/1998 | ............ H04B 7/08 |
| WO | WO97/41647 | | 11/1997 | |
| WO | WO98/51048 | | 11/1998 | |

OTHER PUBLICATIONS

Jung et al., Performance of multicarrier joint detection CDMA mobile communications systems, Vehicular Technology Conference, 1997 IEEE 47th, vol.: 3, May 4-7, page(s) 1892-1896.*

Jung et al. , On multicarrier mobile radio systems with joint detection and coherent receiver antenna detection, Universal Personal Communications, 1996 5th IEEE International Conference, vol.: 1, Sep. 29-Oct. 2, page(s) 61-65.*

(Continued)

*Primary Examiner*—Amanda T. Le
*Assistant Examiner*—Lawrence B. Williams
(74) *Attorney, Agent, or Firm*—Knobbe, Martens, Olson & Bear, LLP.

(57) ABSTRACT

A method of transmitting data signals from at least two transmitting terminals to at least one receiving terminal with a spatial diversity antenna comprises transmitting from the transmitting terminals transformed data signals, being transformed versions of the data signals; receiving on the spatial diversity means received data signals being at least function of at least two of the transformed data signals; subband processing of at least two of the received data signals in the receiving terminal; and determining estimates of the data signals from subband processed received data signals in the receiving terminal.

41 Claims, 9 Drawing Sheets

OTHER PUBLICATIONS

Joint detection for multicarrier CDMA mobile radio systems-Part 1: System Model, Spread spectrum Techniques and Applications Proceedings, 1996 IEEE 4th International Symposium, vol. 3, Sep. 22-25, page(s) 991-995.*

Kuzminsky et al., Multistage semi-blind spatio-temporal processing for short burst multiuser SDMA systems, Signals, Systems & Computers, 1998. Record of the Thirty-Second Asilomar Conference, vol.: 2, Nov. 1-4, 1998, page(s) 1887-1891.*

R. Chang, "Synthesis of Band-Limited Orthogonal Signals for Multichannel Data Transmission", The Bell System Technical Journal, vol. 45, Dec. 1966, pps. 1775-1796.

B. Saltzberg, "Performance of an Efficient Parallel Data Transmission System", IEEE Transactions on Communication Technology, vol. COM-15, No. 6, Dec. 1967, pps. 805 811.

Mueller, et al., "Performance of Coherent OFDM-CDMA for Broadband Mobile Communications", Wireless Personal Communications 2, 1996, pps. 295-305.

S. Kaiser, "OFDM-CDMA versus DS-CDMA: Performance Evaluation for Fading Channels", ICC, 1995, pps. 1722-1726.

I. Kafat, "The Multitone Channel", IEEE Transactions on Communications, vol. 37, No. 2, Feb. 1989, pps. 119-124.

Fazel, et al., "Multi-Carrier Spread-Spectrum", Kluwer Academic Publishers, 1997, pps. 1-4.

Van de Perre, et al., "Adaptive loading strategy for a high speed OFDM-based WLAN", Globecom 1998, pps. 1936-1940.

Chiani, et al., "Service Availability of Broadband Wireless Networks for Indoor Multimedia at Millimeter Waves", ISSSE, 1998, pps. 29-33.

Ihara, et al., "Research Activities on Millimeter-wave Indoor Wireless Communication Systems at CRL", ICUPC, 1995, pps. 197-200.

Paulraj, et al., "Space-Time Processing for Wireless Communications", IEEE Signal Processing Magazine, Nov. 1997, pps. 49-83.

Tsoulos, et al., "Wireless Personal Communications for the 21st Century: European Technological Advances in Adaptive Antennas", IEEE Communications Magazine, Sep. 1997, pps. 102-109.

R. Roy, "An Overview of Smart Antenna Technology and Its Application to Wireless Communication Systems", ICPWC, 1997, pps. 234-238.

Jeng, et al., "Experimental Study of Antenna Arrays in Indoor Wireless Applications", IEEE, 1996, pps. 766-770.

Vandenameele, et al., "An SDMA Algorithm for High-Speed WLAN. Performance and Complexity", Globecom 1998, pps. 189-194.

Raleigh, et al., "Spatio-Temporal Coding for Wireless Communication", IEEE, 1998, pps. 357-366.

Fang, et al., Military Communications Conference Proceedings, 1999, Performance of Successive Interference Cancellation for a Multicarrier DS/CDMA System.

Jung, et al.,Frequenz, De, Schiele Und Schon GMBH Berling, A Generalized View on Multicarrier CDMA Mobile Radio Systems with Joint Detection (Part I), pp. 174-185, 1997.

Jung. et al., Frequenz, De, Schiele Und Schon GMBH Berling, A Generalized View on Multicarrier CDMA Mobile Radio Systems with Joint Detection (Part II), pp. 270-275, 1997.

Kaiser, et al., "A Spread-Spectrum Multi-Carrier Multiple-Access System for Mobile Communications", 1997.

Kuzminskiy, et al. Conference on Signals, Systems and Computers, "Multistage Semi-Blind Spatio-Temporl Processing for Short Burst Multiuser SDMA Systems", 1998.

Vandenameele, et al., Vehicular Technology Conference, "A Combined OFDM/SDMA Approach for WLAN", 1999 IEEE.

Vandenameele, et al., Global Telecommunications Conference, "A Novel Class of Uplink of OFDW/SDMA Algorithmns for WLAN", 1999.

* cited by examiner

LS-OFDM/SDMA operation count

|  | initialization | processing |
|---|---|---|
| multiplications | $A^3/3 + 2A^2U$ | $AU$ |
| additions | $A^3/3 + 2A^2U$ | $AU$ |
| data transfers | $A^3 + 9A^2U$ | $6AU$ |

FIG. 9 pcSIC-OFDM/SDMA operation count

|  | initialization | processing |
|---|---|---|
| multiplications | $A^3U/3 + 12A^2U$ | $2AU - A$ |
| additions | $A^3U/3 + 12A^2U$ | $2AU - A$ |
| data transfers | $A^3U/3 + 24A^2U$ | $10AU - 4A$ |

FIG. 10 additional operation count for SI

|  | initialization | processing |
|---|---|---|
| multiplications | $AU^2/2$ | $2(M/N\,AU + A)$ |
| additions | $(AU^2 + N)/2$ | $2(M/N\,AU + A)$ |
| data transfers | $AU^2 + N/2$ | $10(M/N\,AU + A)$ |

FIG. 11

METHOD AND APPARATUS FOR MULTI-USER TRANSMISSION

RELATED APPLICATION

This application claims priority to and incorporates by reference in its entirety Provisional Application No. 60/130,071, filed on Apr. 19, 1999.

BACKGROUND OF THE INVENTION

1. Field of the Invention

The present invention relates to an apparatus and methods for high-speed multi-user wireless communication.

2. Description of Related Technology

The idea to use multicarrier methods as a modulation technique is known in the art [Chang, R. W. "Synthesis of band-limited orthogonal signals for multichannel data transmission," Bell syst. Tech. J., vol.45, pp. 1775–1796, December 1966], [Saltzberg, B. R. "Performance of an efficient parallel data transmission system", IEEE Trans. Comm. Technol., vol. COM-15, December 1967]. Possible benefits following from multi-carrier modulation have been mentioned in many articles [Meuller, T. Brueninghaus, K. and Rohling H. "Performance of Coherent OFDM-CDMA for Broadband Mobile Communications", Wireless Personal Communications 2, Kluwer Academic Publishers, 1996, pp. 295–305], [Kaiser, S. "OFDM-CDMA versus DS-CDMA: Performance Evaluation for Fading Channels", ICC '95, pp. 1722–1726]. Numerous theoretical publications have been written on said attractive modulation technique [Kalet, "The multitone Channel", IEEE Trans. Commun., vol. 37, no. 2, February 1989], [Fazel, G. Fettweis, "Multi-Carrier Spread-Spectrum", Kluwer Academic Publ., 1997]. Specifically in multipath fading propagation situations, such as for example encountered in an indoor environment, multicarrier modulation is a beneficial technique. Indeed, thanks to the insertion of a guard interval containing a cyclic prefix, it enables a very efficient way of combatting ISI, being intersymbol interference. Moreover, adaptive loading techniques make it possible to considerably increase the throughput performances [L. Van der Perre, S. Thoen, P. Vandenameele, B. Gyselinckx, M. Engels. "Adaptive loading strategy for a high speed OFDM-based WLAN". In Globecom '98. Sydney, Australia, November 1998]. However, for a given carrier modulation, the bandwidth efficiency in terms of bits/sec/hertz is fixed. Given the massive growth of wireless communication and the importance of broadband services, the spectrum becomes increasingly scarce. One method to increase the capacity or the bandwidth efficiency of a wireless system, is to apply cellularization in order to reuse spectrum in different non-interfering cells. While this technique has been applied successfully in mobile telephone networks, it is—from an economic point of view—inappropriate for small- or medium-scale indoor networks as WLANs or home LANs. First of all, high operating frequencies (i.e. millimeter wave band) would be required to achieve a reasonable reuse factor [M. Chiani, D. Dardari, A. Zanella, O. Andrisano. "Service Availability of Broadband Wireless Networks for Indoor Multimedia at Millimeter Waves". In ISSSE '98. pp. 29–33, Pisa, Italy, September 1998][T. Ithara, T. Manabe, M. Fujita, T. Matsui and Y. Sugimoto. "Research Activities on Millimeter-Wave Indoor Wireless Communications", in ICUPC '95, Tokyo, Japan, November 1995]. Secondly, cellularisation introduces an extra layer of hierarchy and complicates the protocol stack. Thirdly, cellularisation increases the installation effort. An alternative method that allows spectrum reuse and which has none of the disadvantages of cellularisation, is the application of Space Division Multiple Access (SDMA) techniques [A. Paulraj, C. Papadias. "Space-Time Processing for Wireless Communications", IEEE Signal Processing Magazine, pp. 49–83, November 1997]. Making use of an antenna array, SDMA can separate different users communicating over the same frequency band and at the same time, by exploiting their distinct spatial signature. As such, it allows reuse within one cell of the cellularized space. SDMA has been proposed for single-carrier systems, where its benefits have been extensively proven [G. Tsoulos, M. Beach and J. MacGeehan, "Wireless personal communications for the 21st century: European technological advances in adaptive antennas", IEEE Communications Magazine, Vol. 35, No. 9, pp. 102–9, September 1997],[R. Roy, "An overview of smart antenna technology and its application to wireless communication systems", in IEEE International Conf. On Personal Wireless Communications, pp234–8, New York, N.Y., 1997],[S. Jeng, G. Xu, H. Lin and W. Vogel, "Experimental study of antenna arrays in indoor wireless applications", in Asilomar Conference on Signals, Systems and Computers, pp. 766–70 Los Alamitos, Calif., 1996]. However, these single-carrier SDMA systems for high speed (e.g. 100 Mbps) wireless systems demand a massive amount of processing (e.g. in the order of Gflops) [P. Vandenameele, L. Van der Perre, B. Gyselinckx, M. Engels and H. De Man, "An SDMA Algorithm for High-Speed Wireless LAN", in Globecom 98 Sydney, Australia, pp. 189–194, November 1998]. The combination of OFDM as a modulation technique with an antenna array is known in the art [G. Raleigh and J. Cioffi, "Spatio-Temporal Coding for Wireless Communication", IEEE Transaction on Communications, Vol. 46, No.3, pp. 357–366, March 1998]. However, these algorithms are limited to a single user scenario and do not enable SDMA.

In "A spread-spectrum multi-carrier multiple-access system for mobile communications", Kluwer Academic Publishers, Dordrecht, The Netherlands, Multi-Carrier Spread-Spectrum, 49–56, 1997, S. Kaiser and K. Fazel describe a point-to-point approach wherein both the transmitting and receiving peer have one antenna. Different users are handled by FDMA, each user having a disjunt set of carriers. The data of a single user id spread over a subset of carriers using spread spectrum techniques.

In WO97/416647, separation of the users is based on the spread spectrum code together with channel info. Operation of a ZF or MMSE combiner is carried out over all carriers at once.

A. Kuzminskiy et al. disclose in "Multistage semi-blind spatio-temporal processing for short burst multiuser SDMA systems", Conference on Signals, Systems & Computers, Vol 2, 1–4 November 1998, pages 1887–1891, a successive interference cancellation technique for SDMA in the context of a mixed blind/training-based detection approach. It does not rely on subband processing such as OFDM. Further, it does not use a multicarrier approach. From a frequency point of view, it exploits a complete band. The selection of the determination of the signal of one user will affect the signal for the complete frequency band.

SUMMARY OF THE INVENTION

In a first aspect of the invention (FIG. 1) a method of transmitting data signals from at least two transmitting terminals with each at least one transmitting means to at least one receiving terminal with a spatial diversity receiving means is disclosed. Said spatial diversity receiving means can be a plurality of at least two antenna's being spaced apart or having a different polarization. The transmitting terminals can be grouped in a composite peer. The receiving terminals can be grouped in a processing peer. The spatial diversity receiving means comprises of at least two receiving means related to each other in such a way that said receiving means provide different spatial samples of a same data signal. In a first step in said transmitting method from said transmitting terminals transmitted data signals are transmitted. This transmission can be substantially simultaneously. The spectra of said transmitted data signals can be at least partly overlapping. The transmitted data signals are transformed versions of said data signals. In a second step in said transmitting method on said spatial diversity means received data signals are received. Said received data signals are at least function of at least two of said transmitted data signals. In a third step at least two of said received data signals are subband processed in said receiving terminal. In a last step estimates of said data signals are determined from said subband processed received data signals in said receiving terminal.

Subband processing of a data signal having a data rate, comprises in principle of splitting said data signal into a plurality of data signals, with a lower data rate and modulating each of said plurality of data signals with another carrier. Said carriers are preferably orthogonal. In an embodiment said subband processing of a data signal can be realized by using serial-to-parallel convertors and using a transformation on a group of data samples of said data signal.

The transmission method exploits thus a multi-carrier approach but then in a multi-user context as at least two transmitting terminals are present. The transmission method separates different users or transmitting terminals based on the different spatial samples of the signals received on the spatial diversity means. As such the transmission method can be understood as being a Space Division Multiple Access technique but then in a multi-carrier constellation instead of single carrier. However the method is more than a straightforward concatenation of a Space Division Multiple Access technique and a multi-carrier method. Indeed such a concatenation would result in time-domain processing of the data signals while the invention exploits the inherent frequency parallelism of subband processing techniques which result in a low complexity processing of the data signals in the frequency domain, compared to plain SDMA, being a time-domain technique. This enables low complexity nonlinear processing of the data signals, which improves the performance considerably. Indeed by such nonlinear processing of the data signals the invention exploits the frequency diversity observed for the different users. It can be mentioned that the data signals to be transmitted are often at least partially independent as they are originating from different users, although the transmission method does not rely on this.

In an embodiment of this first aspect of the invention subband by subband processing is disclosed. Said subband by subband processing can also be denoted per-subband or per-carrier processing.

In another embodiment of this first aspect of the invention a method for successive interference cancellation is disclosed. Said successive interference cancellation can be but is not limited to be realized in a subband by subband processing approach.

In yet another embodiment of this first aspect of the invention a method for interference dependent state insertion is disclosed.

In still a further embodiment of this first aspect of the invention a method for exploiting coherence grouping (being subband grouping) during initialization is disclosed.

Said embodiments of said first aspect can be combined.

In a second aspect of the invention a method of transmitting data signals from at least one transmitting terminal with a spatial diversity transmitting means to at least two receiving terminals with at least one receiving means is disclosed. The transmitting terminals can be grouped in a processing peer. The receiving terminals can be grouped in a composite peer. The spatial diversity transmitting means comprises of at least two transmitting means related to each other in such a way that said transmitting means provide different spatial samples of a same data signal. In a first step of the transmitting method combined data signals are determined in said transmitting terminal. Said combined data signals are transformed versions of said data signals. In a second step of the invented transmitting method said combined data signals are inverse subband processed. In a next step said inverse subband processed combined data signals are transmitted with said spatial diversity means. The spectra of said transmitted inverse subband processed combined data signals can be at least partly overlapping. In a further step on at least one of said receiving means of at least one receiving terminal inverse subband processed received data signals are received and then estimates of said data signals are determined from said inverse subband processed received data signals. It can be mentioned that said data signals are often at least partially independent as their destinations are different users, but the invented transmission method does not rely on that. Said first and second aspect of the invention can be combined.

In a third aspect of the invention an apparatus for determining estimates of data signals from at least two substantially simultaneously received data signals is disclosed, where said received data signals have at least partly overlapping spectra. Said apparatus comprises at least of at least one spatial diversity receiving means, circuitry being adapted for receiving said received data signals with said spatial diversity receiving means, circuitry being adapted for subband processing at least two of said received data signals and circuitry being adapted for determining estimates of said data signals from subband processed received data signals. Said apparatus can be exploited in uplink transmission methods in the processing peer.

In an embodiment of this third aspect of the invention parallelism in the apparatus structure is disclosed. This kind of parallelism can be exploited due to the inherent frequency parallelism, typical for the invented transmission methods. Indeed said circuitry being adapted for determining estimates of said data signals from subband processed received data signals can comprises a plurality of circuits each being adapted for determining part of said estimates of said data signals based on part of the subbands of said subband processed received data signals.

In another embodiment of this third aspect of the invention further parallelism is introduced in the apparatus structure in the circuitry being adapted for receiving said received data signals.

In a fourth aspect of the invention an apparatus for transmitting inverse subband processed combined data signals comprising at least of at least one spatial diversity transmitting means, circuitry being adapted for combining data signals, circuitry being adapted for inverse subband processing combined data signals, and circuitry being adapted for transmitting inverse subband processed combined data signals with said spatial diversity means, is disclosed. Said apparatus can be exploited in the downlink transmission methods in the processing peer.

In an embodiment of the invention parallelism in the apparatus structure is introduced either in said circuitry being adapted for combining data or (and) in said circuitry being adapted for transmitting inverse subband processed combined data signals.

An apparatus having the functionality and architectural characteristics of both said apparatus in said third and fourth aspect of the invention can be defined.

One aspect of the invention increases the performance/cost ratio of high-speed wireless networks by providing communication methods (also denoted transmission methods, being transmitting from at least one peer and receiving on at least one other peer) and a dedicated apparatus being inherently multi-user, multi-carrier and exploiting space division multiple access principles. Said transmission methods and said apparatus enables high spectrum efficient communication under multipath fading conditions.

BRIEF DESCRIPTION OF THE DRAWINGS

FIG. 9 presents the operation count (initialization and processing) of Least-Squares-OFDM/SDMA.

FIG. 10 present the operation count (initialization and processing) of pcSIC (per-carrier successive interference cancellation)-OFDM/SDMA.

FIG. 11 presents the additional operation count for State Insertion (initialization and processing).

DETAILED DESCRIPTION OF THE PREFERRED EMBODIMENT

Figure 1:
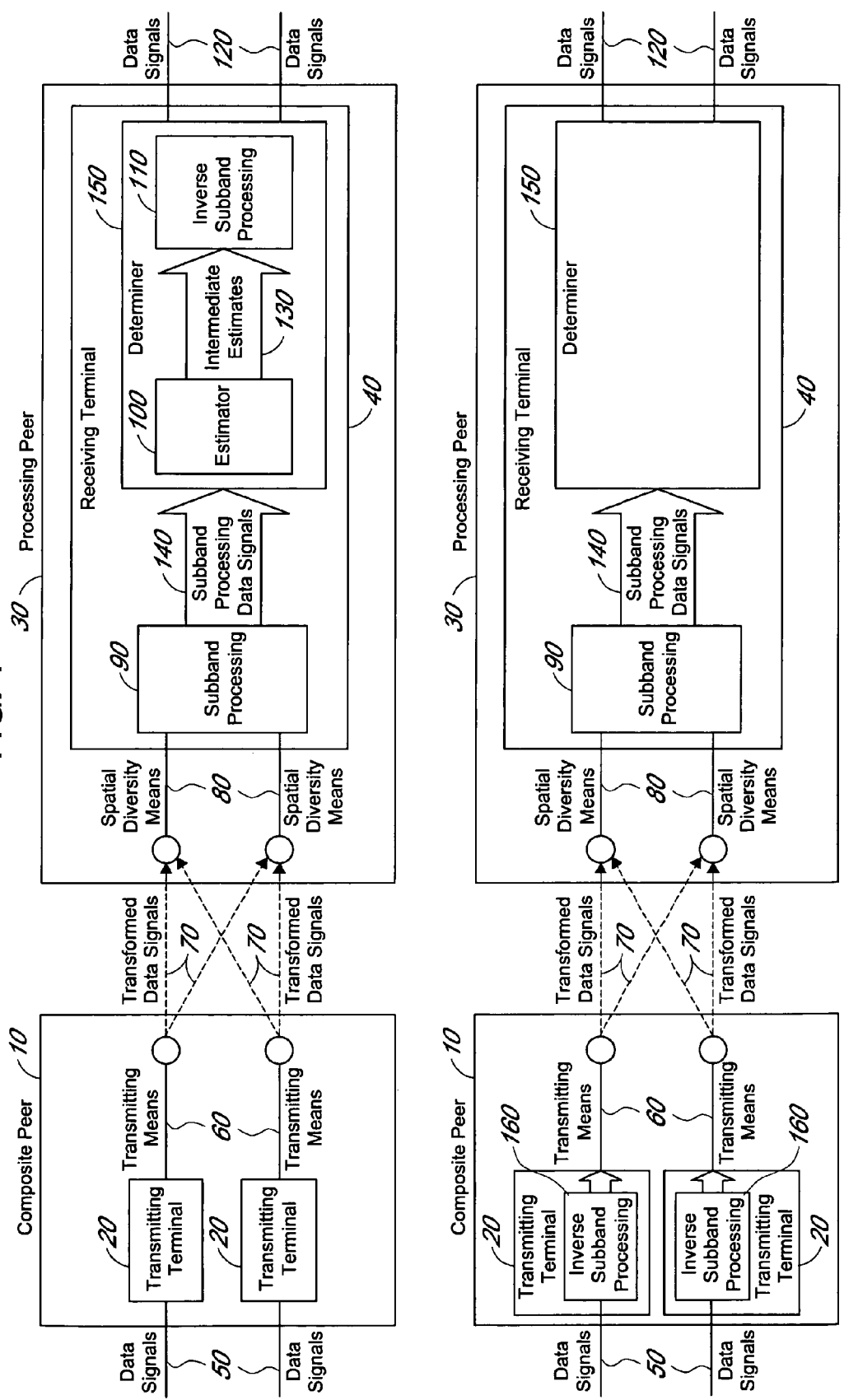
FIG. 1: (Up-link) communication setup with a composite peer (10), comprising of at least two transmitting terminals (20), each having at least one transmitting means (60) and a processing peer (30), comprising of at least one receiving terminal (40), having a spatial diversity receiving means (being represented here but not limited thereto by two spaced apart receiving means (80)). Said receiving terminal (40) at least performs subband processing (90). The top of FIG. 1 shows a concentrated scenario wherein said receiving terminal further performs inverse subband processing (110). The bottom of FIG. 1 shows a split scenario wherein the transmitting terminals further performs inverse subband processing (160).

The invention is not limited to the detailed description of the invention found below.

The invention concerns (wireless) communication between terminals (20)(40)(330)(240). We can logically group the terminals on each side of the communication and call them peers (340) (230) (10) (30). Each peer can embody one or more terminals, whereby at least one peer embodies more than one terminal. The focus of the invention is thus multi-user. The peers can be transmitting and/or receiving information. For example, the peers can communicate in a half-duplex, being either transmitting or receiving at one time instance or a full duplex fashion, being substantially simultaneously transmitting and receiving.

The invention introduces Space Division Multiple Access (SDMA) techniques for systems making use of subband processing, and thus fits in a multi-carrier approach. In the invention, at least one of the communication peers (30)(230) consists of terminal(s) (40)(240) disposing of transmitting and/or receiving means (80)(220) that are able to provide different spatial samples of the transmitted and/or received signals. We will call these transmission and/or receiving means spatial diversity means. We will call the peer(s) disposing of said spatial diversity means the processing peer(s) (30)(230). Said processing peer communicates with at least two terminals at the opposite peer (10) (340), which can operate at least partially simultaneously and the communicated signals' spectra can at least partially overlap. Note that Frequency Division Multiple Access techniques rely on signals spectra being non-overlapping while Time Division Multiple Access techniques rely on communicating signals in different time slots thus not simultaneously. We will call this opposite peer(s) consisting of at least two terminals (20)(330) using the same frequencies at the same time, the composite peer(s) (10)(340). The invention concerns (wireless) communication between terminals whereby at least the processing peer(s) (30)(230) disposes of subband processing means.

The communication between the composite peer and the processing peer can consist of uplink (FIG. 1) and downlink (FIG. 2) transmissions. With uplink transmission is meant a transmission whereby the composite peer transmits data signals and the processing peer receives data signals. With downlink transmission is meant a transmission whereby the processing peer transmits data signals and the composite peer receives data signals. The uplink and downlink transmissions can either be simultaneous (full duplex) (for example using different frequency bands), or they can operate in a time-duplex fashion (half duplex)(for example using the same frequency band), or any other configuration.

(Wireless) transmission of data or a digital signal from a transmitting to a receiving circuit requires digital to analog conversion in the transmission circuit and analog to digital conversion in the receiving circuit. In the further description it is assumed that the apparatus in the communication set-up have transmission and receiving means, also denoted front-end, incorporating these analog to digital and digital to analog conversion means including amplification or signal level gain control and realizing the conversion of the RF signal to the required baseband signal and vice versa. A front-end can comprise of amplifiers, filters and mixers (down converters). As such in the text all signals are represented as a sequence of samples (digital representation), thereby assuming that the above mentioned conversion also takes place. Said assumption does not limit the scope of the invention though. Communication of a data or a digital signal is thus symbolized as transmitting and receiving of a sequence of (discrete) samples. Prior to transmission, the information contained in the data signals can be fed to one or more carriers or pulse-trains by mapping said data signals to symbols which consequently modulate the phase and/or amplitude of the carrier(s)or pulse-trains (e.g. using QAM or QPSK modulation). Said symbols belong to a finite set, which is called the transmitting alphabet. The signals resulting after performing modulation and/or front-end operations on said data signals, are called transformed data signals, to be transmitted further.

After reception by the receiving means, the information contained in the received signals is retrieved by transformation and estimation processes. These transformation and estimation processes can include but should not include demodulation, subband processing, decoding, equalization. After said estimation and transformation processes, received data signals are obtained consisting of symbols belonging to a finite set, which is called the receiving alphabet. The receiving alphabet is preferably equal to the transmitting alphabet.

The invention can further exploit methods and means for measuring the channel impulse responses between the transmission and/or reception means of the individual terminals at the composite peer on the one hand, and the spatial diversity means of the processing peer on the other hand. The channel impulse responses measurement can be either obtained on basis of an uplink transmission and/or on basis of a downlink transmission. The thus measured channel impulse responses can be used by the processing peer and/or composite peer in uplink transmissions and/or in downlink transmissions. The invention can further exploits methods for determining the signal power of received data signals and methods for determining the interference ratio of data signals.

The spatial diversity means ensures the reception or transmission of distinct spatial samples of the same signal. This set of distinct spatial samples of the same signal is called a spatial diversity sample. In an embodiment, spatial diversity means embody separate antennas. In this embodiment, the multiple antennas belonging to one terminal can be placed spatially apart (as in FIGS. 1 and 2), or they can use a different polarization. The multiple antennas belonging to one terminal are sometimes collectively called an antenna array. The invention is maximally efficient if the distinct samples of the spatial diversity sample are sufficiently uncorrelated. In an embodiment, the sufficiently uncorrelated samples are achieved by placing different antennas apart over a sufficiently large distance. For example, the distance between different antennas can be chosen to be half a wavelength of the carrier frequency at which the communication takes place. Spatial diversity samples are thus different from each other due to the different spatial trajectory from the transmitting means to their respective receiving means or vice versa. Alternatively said spatial diversity samples are different from each other due to the different polarization of their respective receiving or transmitting means.

Figure 2:
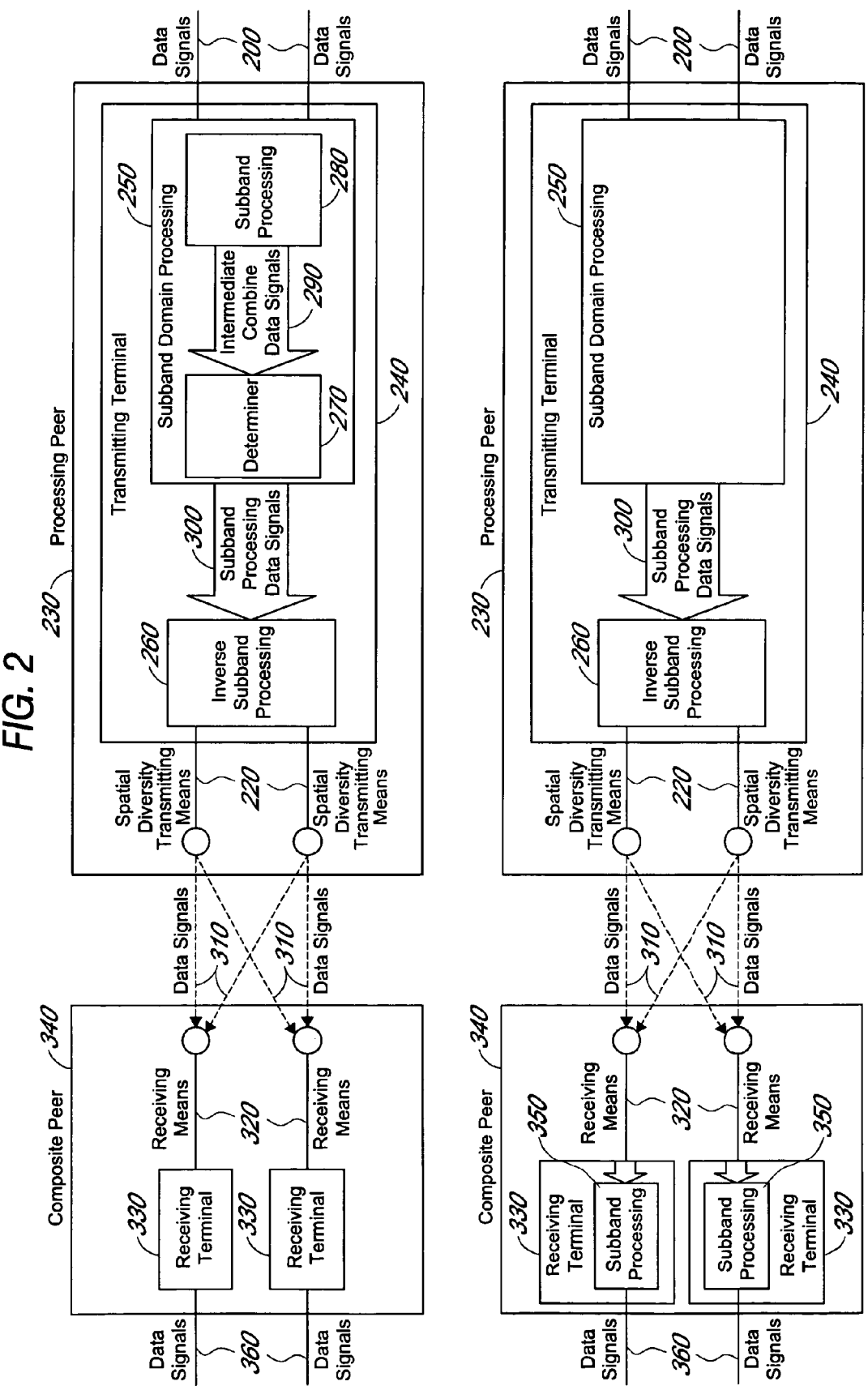
FIG. 2: (Down-link) communication setup with a composite peer (340), comprising of at least two receiving terminals (330), each having at least one receiving means (320) and a processing peer (230), having at least one transmitting terminal (240), having a spatial diversity transmitting means (being represented here but not limited hereto by two spaced apart transmitting means (220)). Said transmitting terminal (240) performs at least inverse subband processing (260). The top of FIG. 2 shows a concentrated scenario wherein said transmitting terminal (240) further performs subband processing (280). The bottom of FIG. 2 shows a split scenario wherein the receiving terminals performs subband processing (350).

The methods described rely on the fact that at least the processing peer performs subband processing, called SP in the sequel, in the uplink mode (FIG. 1), and inverse subband processing, called ISP in the sequel, in the downlink mode (FIG. 2). Furthermore, in the uplink mode ISP takes place either in the composite peer prior to transmission (see FIG. 1 bottom) or in the processing peer after SP (see FIG. 1 top). In the downlink mode, SP takes place either in the composite peer after reception (see FIG. 2 bottom) or in the processing peer before ISP (see FIG. 2 top). The scenarios where both ISP and SP are in either transmission direction carried out in the processing peer, are called concentrated scenarios. The remaining scenarios, i.e. where ISP and SP are carried out in different peers in either transmission direction, are called split scenarios.

The uplink transmission methods can be formalized as a first aspect of the invention being methods of data signals (50) from at least two transmitting terminals (20) with each at least one transmitting means (60) to at least one receiving terminal (40) with a spatial diversity receiving means (80) comprising the following steps: (first step) transmitting from said transmitting terminals (20) transformed data signals (70), being transformed versions of said data signals; (second step) receiving on said spatial diversity means (80) received data signals being at least function of at least two of said (transmitted) transformed data signals (70); (third step) subband processing (90) of at least two of said received data signals in said receiving terminal (40); and (fourth step) determining estimates of said data signals (120) from (the obtained) subband processed received data signals (140) in said receiving terminal.

Said transmitting of said transformed data signals can be substantially simultaneously. The spectra of said transformed data signals can be at least partly overlapping.

In the uplink split scenario said transformation of said data signals (50) to transformed data signals (70) comprises inverse subband processing (160). In the uplink concentrated scenario said determining (150) of estimates of said data signals from (the obtained) subband processed received data signals in said receiving terminal comprises the following steps: (first step) determining (100) intermediate estimates of said data signals (130) from said subband processed received data signals in said receiving terminal; (second step) obtaining said estimates of said data signals (120) by inverse subband processing (110) said intermediate estimates.

The downlink transmission method can be formalized as a second aspect of the invention being methods of transmitting data signals (200) from at least one transmitting terminal (240) with a spatial diversity transmitting means (220) to at least two receiving terminals (330) with at least one receiving means (320) comprising the following steps: (first step) determining (250) combined data signals (300) in said transmitting terminal, said combined data signals being transformed versions of said data signals; (second step) inverse subband processing (260) said combined data signals; (third step) transmitting with said spatial diversity means (220) (the obtained) inverse subband processed combined data signals (310); (fourth step) receiving on at least one of said receiving means (320) of at least one receiving terminal (330) inverse subband processed received data signals; (fifth step) determining estimates of said data signals (360) from said inverse subband processed received data signals.

Said transmitting can be substantially simultaneously. The spectra of said (transmitted) inverse subband processed combined data signals can be at least partly overlapping.

In the downlink split scenario said determining of said estimates of said data signals in said receiving terminals comprises subband processing (350). In the downlink concentrated scenario determining combined data signals in said transmitting terminal comprises the following steps: (first step) determining intermediate combined data signals (290) by subband processing (280) said data signals; (second step) determining (270) said combined data signals from said intermediate combined data signals.

It must be mentioned that said transmission methods intend to transmit data signals from one peer to another peer but that due to transmission conditions in fact only estimates of said data signals can be obtained in the receiving peer. Said transmission methods naturally intend to be such that said estimates of said data signals are approximating said data signals as close as technically possible.

It is a characteristic of the invention that said transmission methods are not a straightforward concatenation of a Space Division Multiple Access technique and a multi-carrier modulation method. Indeed a straightforward concatenation would be to modulate in the transmitting terminal with such a multi-carrier method, then transmit in a Space Division Multiple Access setting and at the receiving terminal combine the different signals received on the spatial diversity means into a combined signal and then demodulate the combined signal. In the split scenario of the invention in the transmitting terminal the (to be transmitted) transformed signal is also modulated with a multi-carrier method and there is a transmission in a Space Division Multiple Access setting but in the receiving terminal first the different received signals on the spatial diversity means are demodulated and only then the demodulated received signals are combined. In the concentrated scenario both modulation and demodulating is concentrated in the receiving peer in the uplink and in the transmitting peer in the downlink. Note that here with modulation and demodulation subband and inverse subband processing is meant and not standard modulation. In an embodiment of both the first and second aspect of the invention implements a multicarrier modulation technique. An example of such a multi-carrier modulation technique uses IFFT as ISP and FFT as SP, and the modulation technique is called Orthogonal Frequency Multiplexing (OFDM) modulation. It can be stated that in said uplink transmission method that said subband processing is orthogonal frequency division demultiplexing. It can also be stated that in said uplink transmission method that said inverse subband processing is an orthogonal frequency division multiplexing. It can also be stated that in said downlink transmission method that said subband processing is orthogonal frequency division demultiplexing. It can also be stated that in said downlink transmission method that said inverse subband processing is orthogonal frequency division multiplexing.

In concentrated scenarios, the processing that is carried out in the processing peer on samples between SP (90) (280) and ISP (110)(260) is called subband domain processing (270)(100). In split scenarios, the processing that is carried out prior to ISP (160)(260) in the transmitting terminal(s) and after SP (90)(350) in the receiving terminal(s), is called subband domain processing (eg. (250)). With before is meant coming earlier in time during the transmission or the reception, and with after is meant coming later in time during the transmission or the reception. In concentrated scenarios, the signals (130)(140) (290)(300) between the SP and the ISP are called signals in subband domain representation. In split scenarios, the signals (50) (300)(200) before the ISP in the transmitting terminal(s) and the signals (360)(140)(120) after the SP in the receiving terminal(s) are called signals in a subband domain representation.

In an embodiment, the subband processing consists of Fast Fourier Transform (FFT) processing and the inverse subband processing consists of Inverse Fast Fourier Transform Processing. By FFT processing is meant taking the Fast Fourier Transform of a signal. By Inverse FFT processing is meant taking the Inverse Fast Fourier Transform of a signal.

In the invention the transmitted sequence is divided in data subsequences prior to transmission. Said data subsequences correspond to subsequences that will be processed as one block by the subband processing means. In case of multipath conditions, a guard interval containing a cyclic prefix or postfix is inserted between each pair of data subsequences in the transmitting terminal(s). If multipath propagation conditions are experienced in the wireless communication resulting in the reception of non-negligible echoes of the transmitted signal and the subband processing means consist of (an) FFT and/or IFFT operation(s), this guard introduction results in the equivalence between convolution of the time-domain data signals and the time-domain channel response with multiplication of the frequency-domain data-signals and the frequency-domain channel response. The insertion of said guard intervals can occur in both concentrated and split scenarios. One can thus state that in an embodiment of the invention in a split scenario, the transmitting terminal(s) insert guard intervals containing a cyclic prefix or postfix between each pair of data subsequences after performing ISP on the data subsequences and before transmitting the data subsequences. In another embodiment of the invention in a concentrated scenario, said guard intervals are inserted in the transmitted sequence between each pair of data subsequences without performing ISP on said data subblocks in the transmitting terminal(s). This can be formalized as follows by stating that in said uplink transmission methods said transformation of said data signals to transmitted data signals further comprises of guard interval introduction. Said guard interval introduction can equally well be applied in the downlink transmission methods. Alternatively overlap and save techniques can be exploited also.

The terminal(s) disposing of the spatial diversity means (thus in the processing peer) dispose(s) of SP and/or ISP means that enable subband processing of the distinct samples of the spatial diversity sample. Also, it disposes of means for combinatory processing. By combinatory processing means is meant means that process data coming from subbands of the distinct samples in the spatial diversity sample. In said combinatory processing means, different techniques can be applied to retrieve or estimate the data coming from the different distinct terminals or to combine the data to be transmitted to distinct terminals. The invention discloses methods for performing said combinatory processing, both for uplink transmission and for downlink transmission.

Combinatory processing in the uplink relates to a communication situation whereby the peer disposing of spatial diversity means, which is called the processing peer, is receiving signals from the composite peer, which embodies different terminals transmitting (at least partially simultaneous) transformed data signals (having at least partially overlapping spectra). With said determining of estimates of said data signals (120) from said subband processed received data signals (140) in said receiving terminal in said uplink transmission method is meant said combinatory processing.

Combinatory processing in the downlink relates to a communication situation whereby the peer disposing of spatial diversity means, which is called the processing peer, is transmitting signals to the composite peer, which embodies different terminals transmitting (at least partially simultaneous) so-called inverse subband processed combined data signals (having at least partially overlapping spectra). With determining (250) combined data signals (300) in said transmitting terminal in said downlink transmission method is meant said combinatory processing.

In the invention further the following notations are used: x is used for a transmitted data sample. The notation Y is used for a received data sample. The notation n is used for a noise sample. The notation X is used for a transmitted data sample matrix. The notation Y is used for a received data sample matrix. The notation N is used for a noise sample matrix. The notation greek symbol sigma is used for the variance of the noise. The notation h(t) is used for the channel impulse response represented in the time domain. The notation h[s] is used for the channel impulse response represented in the frequency domain. The array index s (going from 1 to S) refers to the specific subband to which a sample or a channel impulse response corresponds. The notation S is used for the total number of subbands that are processed by the subband processing means. The superscript index u (going from 1 to U) refers to the individual terminal of the composite peer by which the data signal was sent in the uplink mode, or for which the data signal is intended in the downlink mode. The notation U is used for the number of simultaneous terminals of the same subbands in the composite peer. The subscript index a (going from 1 to A) refers to one specific spatial sample of the spatial diversity sample in the processing peer. The notation A is used for the number of distinct samples in the spatial diversity sample in the processing peer The notation e is used for an equalizer coefficient. The notation E is used for an equalizer coefficient matrix. The notation greek epsilon is used for the stochastical expectation operator. A ~ on top of a symbol indicates a soft estimation of the symbol. With a soft estimation is meant an estimation that is not necessarily contained in the receiving alphabet. A bar on top of a symbol indicates a hard estimation of the symbol. With a hard estimation is meant an estimation that is equal to a symbol contained in the receiving alphabet.

In the invention decision methods are exploited. Said decision methods obtain one or more intermediate hard estimates, on basis of a single soft estimate. In an embodiment of the invention, said decision methods obtain one intermediate hard estimate by determining that signal from the receiving alphabet that has the smallest distance to the soft estimate. In another embodiment of the invention, said decision methods obtain multiple intermediate hard estimates by determining those signals from the receiving alphabet that have the smallest distance to the soft estimate.

In the invention selection methods are exploited. Said selection methods obtain hard estimates for a specific data symbol on basis of intermediate hard estimates of said specific data symbol. In an embodiment of the invention, there is only one intermediate hard estimate for a specific data signal/symbol and the hard estimate is equal to the intermediate hard estimate. In another embodiment, there are several intermediate hard estimates for at least one data signal. From multiple intermediate hard estimates, one intermediate hard estimate for one specific data signal is selected as the hard estimate on basis of a probability criterion.

In the invention recombiner methods are exploited. Said recombiner methods obtain recombined spatial diversity samples, on basis of a hard or intermediate hard estimate, by calculating the spatial diversity samples that would have been received if the data symbol corresponding to said hard or intermediate hard estimate would have been transmitted.

In the invention modifier methods are exploited. Said modifier methods obtain modified spatial diversity samples, by applying the following steps. First, they obtain recombined spatial diversity samples by applying recombiner methods based on previously obtained hard or intermediate hard estimates. Secondly, they obtain modified spatial diversity samples by exploiting the recombined spatial diversity samples and the original spatial diversity samples.

Said modifier methods are exploited in the uplink transmission methods, denoted successive interference cancellation methods, wherein said determining of said estimates of said data signals from said subband processed received data signals in said receiving terminal further comprising for at least one data signal the following steps: (first step) selecting from said data signals a selected data signal; (second step) determining an estimate of said selected data signal from said subband processed received data signals; (third step) modifying said subband processed received data signals based on said estimate of said selected data signal via a modifier method; and (fourth step) determining estimates of said remaining data signals from said modified subband processed received data signals. Note that said selection of a selected data signals is just determining for which signal said method will be applied. Said selection should not be confused with the selection methods described above.

Said modifier methods are also exploited in the uplink transmission methods, denoted state insertion methods, wherein said determining of said estimates of said data signals from said subband processed received data signals in said receiving terminal further comprising for at least one data signal the following steps: (first step)selecting from said data signals a selected data signal; (second step) determining a plurality of estimates of said selected data signal from said subband processed received data signals; (third step) determining a plurality of modified subband processed received data signals, each of said modified subband processed received data signals being based on one of said estimates of said selected data signal, via a modifier method; (fourth step) determining a plurality of estimates of at least one of said remaining data signals from said plurality of modified subband processed received data signals; and (fifth step) thereafter selecting one of said estimates of said selected data signal (by a selection method). Note that said selection of a selected data signals is just determining for which signal said method will be applied. Said selection should not be confused with the selection methods described above.

It can be mentioned that said estimate of said selected data signal in said successive interference cancellation methods can be considered to be a hard estimate. Said plurality of said estimates of said selected data signal in said state insertion methods can be considered as intermediate hard estimates. Said plurality of estimates of said remaining data signals in both said methods can be either (intermediate) hard or soft estimates.

In the invention, methods for coherence grouping of subbands is presented. Said coherence grouping methods reduce the initialization effort, and can be used both in uplink and downlink transmissions. Said coherence grouping methods partition the S subbands in groups of adjacent subbands, each group i consisting of $G_I$ subbands. The initialization computations are in said coherence grouping methods performed only once for each subgroup, instead of for each subband separately. Said coherence grouping methods do not affect the performances of the combinatory processing methods, provided all subbands in a subgroup experience sufficiently correlated channel impulse responses. Therefore, the numbers $G_I$ are limited by the communication situation in order for the invention to be maximally efficient. For the initialization effort, said coherence grouping method results in a reduction of the computation complexity with a factor G, whereby G is the average of the numbers $G_I$ of the subbands in the subgroups. In an embodiment, the communication is based on OFDM transmission and the numbers $G_I$ are all chosen equal to a fixed part of the coherence bandwidth divided by the spacing between the carriers. The coherence bandwidth of the channel is the bandwidth over which the channel response is correlated. On a multipath propagation channel, said coherence bandwidth is inversely proportional to the relative delay of the echoes on the channel. In another embodiment, the numbers $G_I$ are calculated on basis of a channel impulse response measurement, more specifically from the gradient of this channel impulse response. More formalized one can state that said determining of said estimates of said data signals in said receiving terminal comprises two steps. The first step is the initialization step wherein relations between said data signals and subband processed received data signals are determined. In the second step being the actual combinatory processing said relations between said data signals and said subband processed received data signals are exploited for determining said data signals. The coherence grouping method is then characterized by stating said subbands are grouped into sets, at least one set comprising of at least two subbands and that said initialization step is performed on a set-by-set basis.

In the invention, methods for combinatory processing for uplink communication are presented. Said combinatory processing for uplink communication methods obtain in the receiving terminal estimates for data signals transmitted from one or more terminals in the composite peer, on basis of the subband processed spatial diversity samples, which can also be denoted subband processed received data signals.

In the invention, methods for per-subband combinatory processing for uplink communication are presented. Said per-subband combinatory processing for uplink communication methods obtain in the receiving terminal estimates for data signal(s) transmitted from one or more terminals in the composite peer and in one specific subband, on basis of the subband processed spatial diversity samples in that one specific subband, which can also be denoted subband processed received data signals in that one specific subband. Said per-subband combinatory processing methods can be formalized as methods in which said determining of estimates of said data signals in said receiving terminal is performed on a subband by subband basis.

In an embodiment of the invention, said methods for per-subband combinatory processing for uplink communication obtain estimates for data signal(s) from at least one terminal in the composite peer and in one specific subband, by applying the following steps. First, they obtain soft estimates for the data signal(s) from each of these terminals and in that specific subband, by applying per-subband scalar combinatory processing for uplink communication methods. Secondly, they obtain estimates by applying decision methods on each of said soft estimates.

In one embodiment of the invention, methods for per-subband scalar combinatory processing for uplink communication are presented. Said per-subband scalar combinatory processing for uplink communication methods obtain soft estimates for data signal(s) in one subband and from one terminal in the composite peer, on basis of spatial diversity samples or modified spatial diversity samples in that subband. In an embodiment of the invention, said methods for per subband scalar combinatory processing for uplink communication obtain soft estimates for data signal(s) in one subband and from one terminal in the composite peer with linear methods. In this embodiment, the estimates of the data signal(s) transmitted by the terminal(s) of the composite peer $\tilde{x}^U[s]$ are calculated by linearly combining the single corresponding carrier signals or subbands received on the different antennas with the equalizer coefficients E[s], following Formula 1 below.

$$\underbrace{\begin{bmatrix} \tilde{x}^1[s] \\ \vdots \\ \tilde{x}^U[s] \end{bmatrix}}_{\tilde{X}[s]} = \underbrace{\begin{bmatrix} e_1^1[s] & \cdots & e_A^1[s] \\ \vdots & & \vdots \\ e_1^U[s] & \cdots & e_A^U[s] \end{bmatrix}}_{E[s]} \cdot \begin{bmatrix} y_1[s] \\ \vdots \\ y_A[s] \end{bmatrix} \qquad \text{Formula 1}$$

In an embodiment, the linear estimation is performed on basis of least-squares (LS) methods. In this embodiment of the invention, said E[s] is calculated to minimize the expectations given in Formula 2. For a given noise energy (sigma squared) and conditions on x given by Formula 3, E[s] obeys the U sets of linear equations of Formula 4, wherein the superscript H denotes the Hermitian transpose.

$$\epsilon\{(x^u[s]-\tilde{x}^u[s])^*(x^u[s]-\tilde{x}^u[s])\} \qquad \text{Formula 2}$$

$$\epsilon\{x^u[s]^* \tilde{x}^u[s]\}=1 \qquad \text{Formula 3}$$

$$[H[s]H[s]^{H+\sigma 2}I_{A \times A}]E^H - H[s] = 0 \qquad \text{Formula 4}$$

In an embodiment of the invention, said methods for per subband scalar combinatory processing for uplink communication obtain soft estimates for data signal(s) in one subband and from one terminal in the composite peer by linear zero forcing (ZF) methods. In this embodiment of the invention, said E[s] is calculated to maximally annihilate the channel distortion without taking the noise energy into account, in a so-called zero-forcing way. In this embodiment E[s] obeys the U sets of linear equations of Formula 5.

$$[H[s]^H]E^H - I_{U \times U} = 0 \qquad \text{Formula 5}$$

In an embodiment of the invention, said methods for per subband combinatory processing for uplink communication obtain soft estimates for data signal(s) in one subband and from one terminal in the composite peer with non-linear methods such as for example maximum likelihood symbol estimation (MLSE).

In the invention, methods for combinatory processing for downlink communication are presented, called downlink combinatory processing methods. Said downlink combinatory processing methods are carried out in the processing peer to facilitate the estimation in the composite peer of the transmitted data signals from the processing peer. Said downlink combinatory processing methods produce a spatial diversity sample, on basis of at least two data signals, resulting in combined data signals. Said combined data signals then undergo ISP, and are afterwards transmitted by the spatial diversity means, resulting in transmitted data signals, the spectra of said transmitted data signals being at least partly overlapping. The transmitted data signals are then transmitted on the channel. Said combinatory processing can be described as a step for determining combined data signals in said transmitting terminal, said combined data signals being transformed versions of said data signals. Thereafter inverse subband processing of said combined data signals is performed, followed by transmitting with said spatial diversity means said inverse subband processed combined data signals, the spectra of said transmitted inverse subband processed combined data signals being at least partly overlapping.

In an embodiment of the invention, said methods for combinatory processing for downlink communication apply per-subband combinatory processing for downlink communication in at least one subband. In this embodiment, said downlink combinatory processing methods produce a combined data signal in one subband, on basis of the data signals in that specific subband. This can be described as determining of combined data signals in said transmitting terminal on a subband by subband basis.

In an embodiment of the invention, said downlink combinatory processing methods calculate said combined data symbol, called Y[s] by linearly combining the data signals, called X[s], with a precompensation matrix $E_{PRE}[s]$. In this embodiment, the Formula 6 holds:

$$X[s] = H^T[s] \cdot \underbrace{E_{PRE}[s] \cdot Y[s]}_{Y_{TR}[s]} + N''[s] \qquad \text{Formula 6}$$

In an embodiment, U=A and $E_{PRE}[s]$ is the inverse of the channel matrix $H^{T(-1)}[s]$.

In another embodiment, U<A and $E_{PRE}[s]$ is the pseudo-inverse of the channel matrix such that Formula 7 holds:

$$H^T[s].E_{PRE}[s] = I_{U \times U} \qquad \text{Formula 7}$$

In an embodiment of the invention, said methods for combinatory processing for downlink communication take into account non-idealities in the analogue front-end(s) in the transmitting- and or receiving terminal(s).

In an embodiment of the invention, said methods for combinatory processing for downlink communication avoid distortion in the analogue front-end(s).

In an embodiment of the invention, said precompensation matrix comprises nulls for one or more data signals on one or more specific subbands. In this embodiment, efficient and effective power usage can be obtained.

In an embodiment of the invention, as well the terminals in the processing peer as the terminals in the composite peer dispose of spatial diversity means and of subband and combinatory processing means, and both the processing and the composite peers embody at least two terminals transmitting data signals at least partially simultaneously whereby these transmitted data signals have at least partially overlapping spectra. In this embodiment, both the uplink and the downlink combinatory processing methods can be used in either transmission direction between two peers.

In a preferred embodiment, the processing peer is the basestation of a star-configuration network, which can be connected to the backbone of a wired network. Different terminals communicate simultaneously in the same frequency band with the basestation. The terminals only need a single front-end, and a plain OFDM-modem (i.e. without SDMA processing capabilities). This embodiment can work in a multipath fading environment, for applications such as for example Wireless Local Area Networks. This embodiment can work in the 5–6 GHz band, and can achieve a network capacity of 155 Mbps and above. In this embodiment, the spatial diversity means consisting of multiple transmitting and/or receiving means are concentrated in the basestation, thus reducing the overall hardware complexity and cost of the configuration. In this embodiment, the spatial diversity means comprises of multiple antennas spaced half a wavelength apart. Also, the peers communicate on basis of OFDM as a modulation technique. The ISP and SP are performed on basis of IDFT (Inverse Discrete Fourier Transform) and DFT (Discrete Fourier Transform) processing respectively, and the subbands can be referred to as carriers. A guard interval containing a cyclic prefix is inserted between OFDM symbols at the transmitter side. SDMA is then applied in the frequency-domain. In addition to the aggregate of the advantages of both OFDM and SDMA, this approach results in simpler exploitation of spatial diversity compared to time-domain methods. For the estimation algorithms of the OFDM/SDMA systems, known least-squares (LS) or maximum likelihood symbol estimation (MLSE) algorithms can be applied. Also a novel class of uplink OFDM/SDMA methods with improved performance and still low complexity can be applied. These methods implement successive interference cancellation per carrier, state insertion and coherence grouping.

To illustrate the performance, the algorithms are applied to a 100 Mbps OFDM/SDMA WLAN. It has a 4-antenna basestation that separates up to 4 simultaneous users by SDMA. Each of these transmit 256-OFDM symbols at a datarate of 25 Mbps with QPSK. The guard interval is designed to comprise all the echoes received on the multi-path propagation channel, so that the channel convolution becomes cyclic after removal of the guard interval. Thus, in the frequency-domain it becomes equivalent to multiplication with the Fourier transform of the channel, $h^U_a[s]$. Measures are taken to synchronize the different users communicating simultaneously in the same band. Under these conditions, the received data Y[s] can be written as in Formula 8. It is possible under the given circumstances to calculate an estimation $\tilde{X}^u[s]$ of the data sequences $X^u[s]$ on a carrier per carrier basis. This per carrier estimation greatly simplifies the SDMA processing, and it allows a profound parallellization of this processing. Indeed an apparatus for performing SDMA/OFDM can comprise of a plurality of circuits being adapted for determining estimates of data signals based on part of the subbands of the subband processed received data signals, preferably one subband per circuit. Subsequently to the per carrier estimation, a decision on which element of the transmitting alphabet is nearest to the signal(s) resulting from the per carrier estimation. Said decision results in hard estimates $\tilde{x}^u$.

$$\underbrace{\begin{bmatrix} y_1[s] \\ \vdots \\ y_A[s] \end{bmatrix}}_{Y[s]} = \underbrace{\begin{bmatrix} h_1^1[s] & \ldots & h_1^U[s] \\ \vdots & & \vdots \\ h_A^1[s] & \ldots & h_A^U[s] \end{bmatrix}}_{H[s]} \cdot \underbrace{\begin{bmatrix} x^1[s] \\ \vdots \\ x^U[s] \end{bmatrix}}_{X[s]} + \underbrace{\begin{bmatrix} n_1[s] \\ \vdots \\ n_A[s] \end{bmatrix}}_{N[s]} \quad \text{Formula 8}$$

The per carrier SDMA processing in the up link can be performed in a linear fashion. In this case, the estimates of the data signals transmitted by the terminals Ux[s] are calculated by linearly combining the single corresponding carrier signals received on the different antennas with the equalizer coefficients E[s], following Formula 1.

Said E[s] is calculated to minimize the expectations given in Formula 2. For a given noise energy (sigma squared) and conditions on x given by Formula 3, E[s] obeys the U sets of linear equations of Formula 4, wherein the superscript H denotes the Hermitian transpose.

Subsequently to equalization, the soft estimates are fed into a slicer, which determine the nearest constellation points with a decision method. This results in the hard estimates Ux. The equalizer coefficients E[s] could alternatively be calculated to maximally annihilate the channel distortion without taking the noise energy into account, in a so-called zero-forcing way. In this method, E[s] obeys the U sets of linear equations, given by Formula 5.

The performance of the system is evaluated by simulation with realistic channel data obtained from ray-tracing. The resulting curves show the bit error rate (BER) as a function of the received signal-to-noise ratio per bit (SNR).

Figure 3:
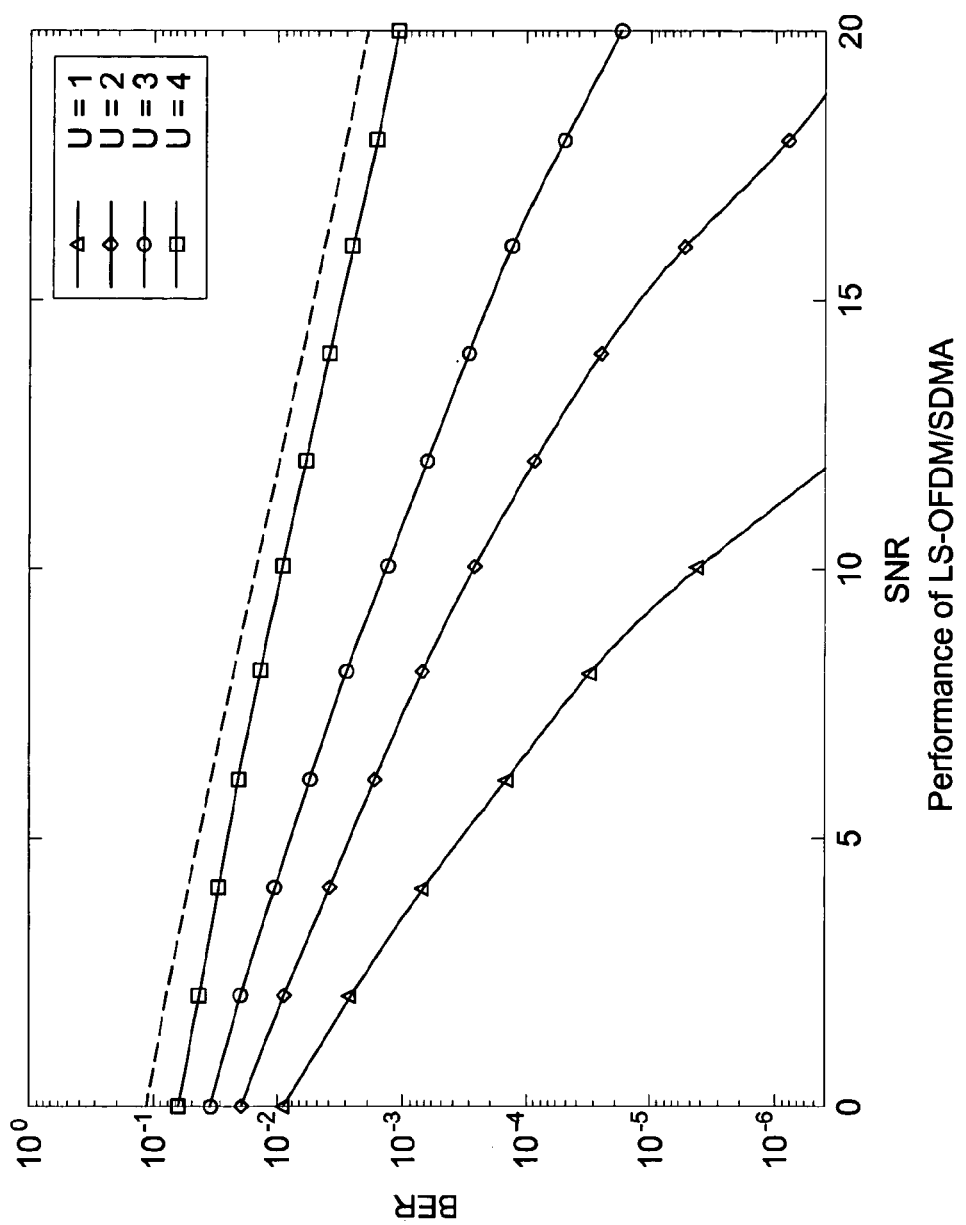
FIG. 3 shows the performance of an embodiment of the invention being uplink Least-Squares-OFDM/SDMA for one to four simultaenous users. The Bit Error Rate (BER) is shown as function of the Signal to Noise Ratio (SNR). Said embodiment can be exploited for an arbitrary number of users. In said embodiment OFDM is exploited as subband method, through exploiting of inverse fast Fourier transform and fast Fourier transform. Said determining of estimates of data signals from subband processed received data signals is in said embodiment based on Least-Squares methods.

FIG. 3 shows the performance of LS-OFDM/SDMA for one to four simultaneous users. As a reference, the dashed curve gives the performance of a single-user single-antenna 100 Mbps plain OFDM link. An important observation is that the four-antenna four-user LS-OFDM/SDMA system outperforms plain OFDM. This demonstrates that a bandwidth re-use factor four is achievable without any performance penalty.

To evaluate the implementation complexity, we determine the total number of operations needed to execute the LS-OFDM/SDMA algorithm. The overall functionality can be separated into initialization and processing. During initialization, the equalizers $E_{LS}[s]$ are calculated from Formula 4 by Gaussian elimination with multiple right-hand sides. During processing, equalization and slicing have to be performed, which respectively correspond to a matrix multiplication and a set of comparators. Note that processing is done continuously, at the symbolrate, opposed to the initialization which is only calculated once. FIG. 9 summarizes the approximative number of multiplications, additions and data transfers needed for the execution of both phases, per sub-carrier. The number of data transfers is an indicative number for the amount of memory/register transfers. Since the architecture has not been determined yet, the allocation of the data transfers to memory or register banks is an open issue. However, it is important to stress that data transfers often are the implementation bottleneck. As an example, the four-user four-antenna system from would require 72 kflops and 200 kdata transfers during initialization and 400 Mflops/sec and a data transfer bandwidth of 1.2 Gwords/sec during processing.

In an OFDM/SDMA system, for certain subcarriers one or more users may be completely buried in multi-user interference (MUI) or have highly correlated channel vectors. Obviously, these users will suffer from residual MUI and noise after linear equalization. To mitigate this effect, in the invention Successive Interference Cancellation (SIC) is used, preferably Per Carrier (pcSIC). Opposed to LS-OFDM/SDMA, this technique does not estimate all users simultaneously, but does this successively, preferably on a certain subcarrier. As such the MUI originating from users that have been detected already, can be removed (thereby modifying the original signal carrier). This technique relies on feedback of intermediate hard estimates and is thus non-linear. Note also that pcSIC-OFDM/SDMA —since it works preferably on a per-carrier basis—elegantly exploits frequency diversity, which is another example of synergy from the OFDM/SDMA combination. Further per-carrier successive interference cancellation (pcSIC) is presented, although the invention is not limited hereto. On each subcarrier n, the detection order is first determined, preferably according to the received signal power. We assume that user 1 to user U are properly ordered. Successively, each user's soft estimate is calculated by least-squares linear combining according to Formula 9.

$$\tilde{x}^u[s] = \underbrace{[e_1^u[s] \ldots e_A^u[s]]}_{E_{LS}^u[s]} \cdot \begin{bmatrix} y_1^u[s] \\ \vdots \\ y_A^u[s] \end{bmatrix} \quad \text{Formula 9}$$

$$H^u[s] = \begin{bmatrix} h_1^u[s] & \ldots & h_1^U[s] \\ \vdots & & \vdots \\ h_A^u[s] & \ldots & h_A^U[s] \end{bmatrix} \quad \text{Formula 10}$$

In this equation $E_{LS}[s]$ is found as in Formula 4 except that for each iteration u, H[s] is replaced by Formula 10 with the $y_a^1[s]$ equal to the initial $y_a[s]$ from Formula 8. Afterwards, the MUI originating from user u is reconstructed (in general called recombining) and subtracted (thereby modifying) from the residual MUI as in Formula 11 with $\tilde{x}^U[s]$ the hard intermediate estimate of user u after slicing (being a decision method). In the plain pcSIC algorithm, there is only one intermediate hard estimate for each data signal on each carrier, which will consequently be selected as the hard estimate (being a selection method).

$$\begin{bmatrix} y_1^{u+1}[s] \\ \vdots \\ y_A^{u+1}[s] \end{bmatrix} = \begin{bmatrix} y_1^u[s] \\ \vdots \\ y_A^u[s] \end{bmatrix} - \begin{bmatrix} h_1^u[s] \\ \vdots \\ h_A^u k[s] \end{bmatrix} \tilde{x}^u[s] \quad \text{Formula 11}$$

Successive Interference Cancellation (SIC) can be described as an uplink transmission method wherein said determining of said estimates of said data signals from said subband processed received data signals in said receiving terminal for at least one data signal (but not limited to one) comprises the following steps: (first step) selecting from said data signals a selected data signal. This selecting step can for instance be, but is not limited to, selecting the first data signal from the data signals that are ordered according to received signal power. (second step) determining an estimate of said selected data signal from said subband processed received data signals, for instance, but not limited to, by linear combining of the subband processed received data signals including slicing. (third step) modifying said subband processed received data signals based on said estimate of said selected data signal, for instance, but not limited to, by recombining and subtraction according to Formula 11, such that modified subband processed received data signals are obtained. (fourth step) Finally, estimates of said remaining data signals from said modified subband processed received data signals are determined, possibly by applying the same steps successively. Note that subband can also be denoted carriers. In an embodiment of the successive interference cancellation uplink transmission method said determining of estimates (all steps) is performed on a subband by subband basis.

Figure 4:
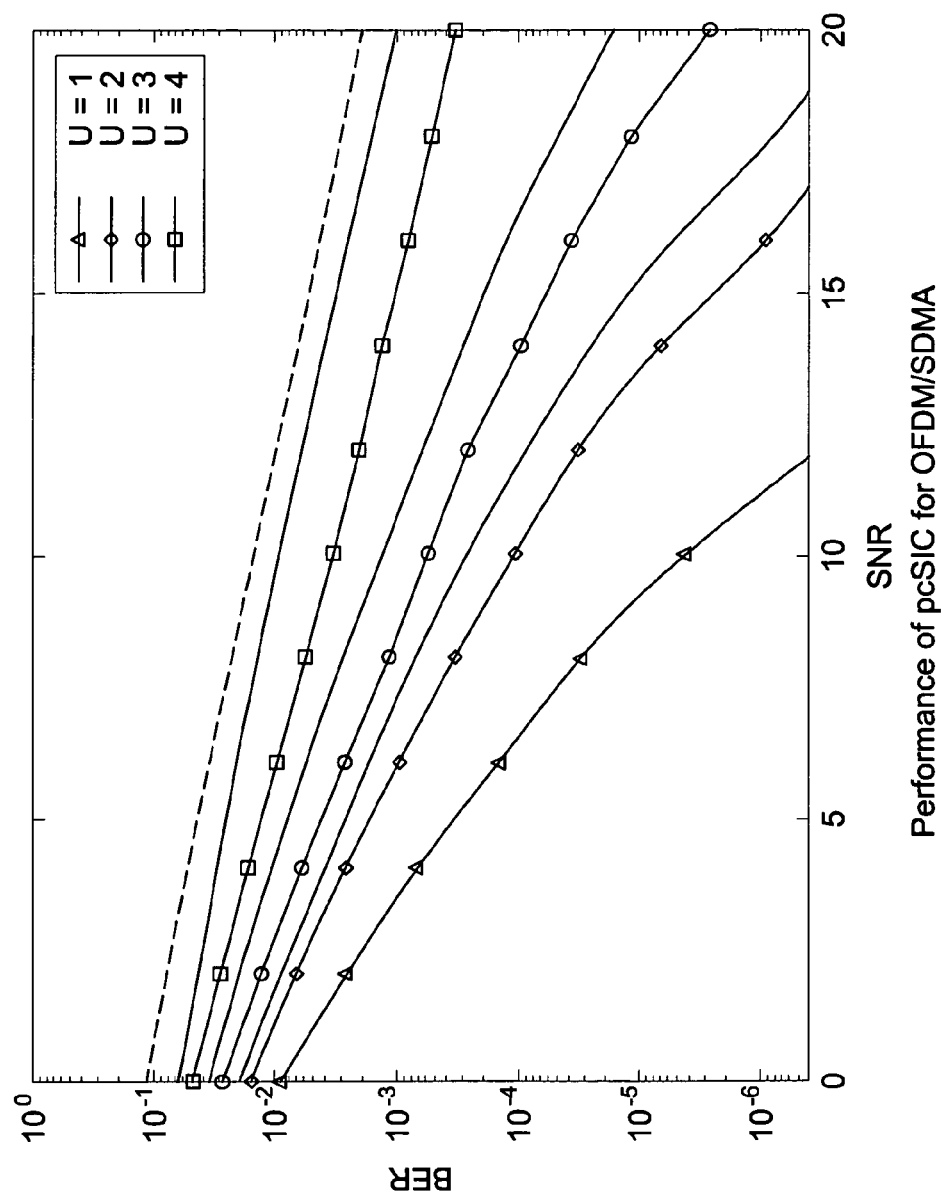
FIG. 4 shows the performance of pcSIC (per-carrier successive interference cancellation) for uplink OFDM/SDMA for one to four simultaneous users. The Bit Error Rate (BER) is shown as function of the Signal to Noise Ratio (SNR). Said embodiment can be exploited for an arbitrary number of users. Said determining of estimates of data signals from subband processed received data signals is in said embodiment based on determining an estimate of a selected data signal, in a Least-Squares sense, then modifying subband processed received data signals, and finally determining estimates of the remaining data signals, being all data signals except the selected data signal. For said remaining data signals said determining of estimates of a selected data signal can be exploited also. Said selection of data signals approach results in introducing an ordering in which estimates of data signals will be determined.

FIG. 4 shows the performance of pcSIC-OFDM/SDMA. Again, the BER over SNR curves are given for one to four users. As a reference, the dashed curve gives the performance of single-user single-antenna 100 Mbps plain OFDM and the thin curves give the performance of LS-OFDM/SDMA. It shows that pcSIC-OFDM/SDMA yields a performance improvement compared to LS-OFDM/SDMA that increases with an increasing number of users. To be specific, for a BER of 0.001 and for four simultaneous users, we observe a 5 dB gain. For a complexity estimation of the pcSIC algorithm for OFDM/SDMA, we also discern between initialization and processing. During initialization, the cancellation order is determined and the equalizers are calculated. Since the channel matrix is different for each user u the latter would require U distinct Gaussian eliminations. However, by exploiting structural relationships between the $H^u[s]$'s, we managed to reduce the required number of operations with $O(A^2 U^2)$. During processing, reconstruction (recombination) and subtraction (modification) have to be performed in addition to equalization and slicing. The total approximative number of operations for both phases of the pcSIC-OFDM/SDMA algorithm are given in FIG. 10. More specific, the four-user four-antenna system would require respectively 170 kflops and 250 kdata-transfers in the initialization phase and 700 Mflops/sec and a data-transfer bandwidth of 1.8 Gwords/sec.

Figure 5:
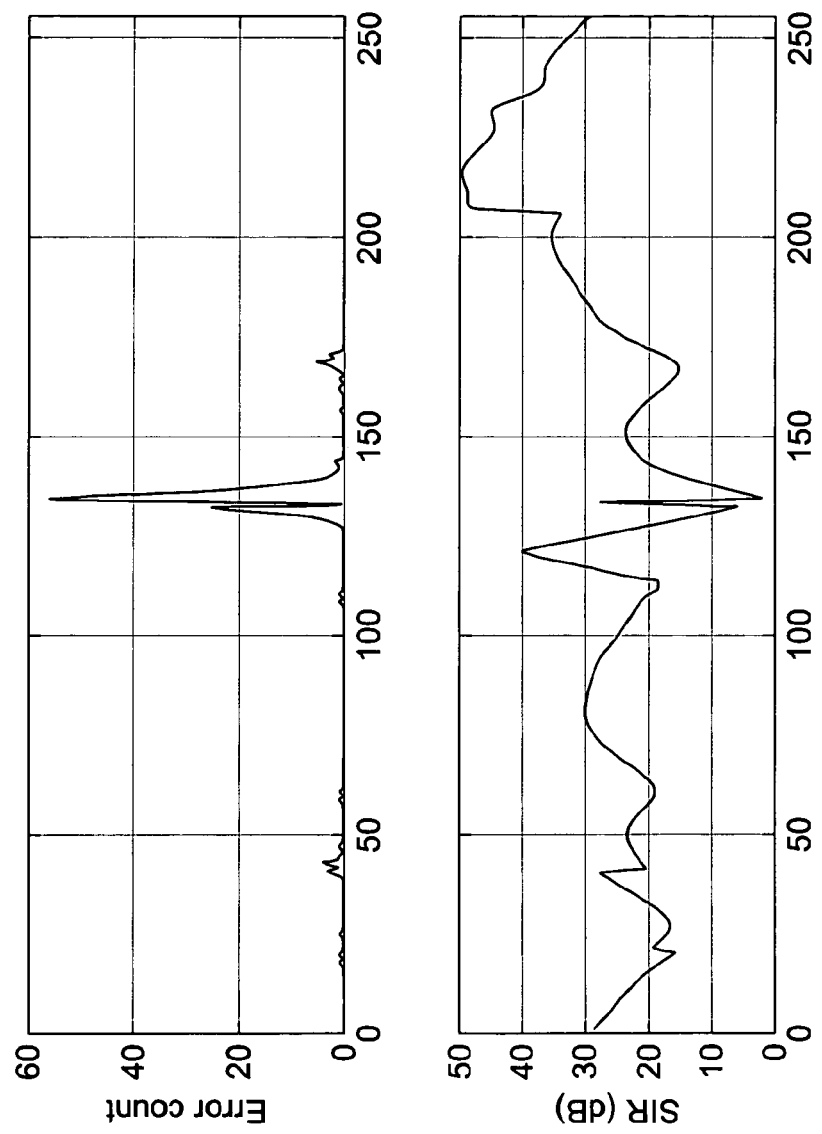
FIG. 5: Error propagation with uplink SIC-OFDM/SDMA. The error count and the Signal Interference Ration (SIR) is shown as function of frequency. Said observation of the error propagation motivates the use of State Insertion methods.

A potential weakness of (pc)SIC-OFDM/SDMA is that its performance degrades when at least two users are received with approximately equal power. Under such transmission conditions, the probability of making an erroneous decision is increased, resulting in error propagation. This potential deficiency is illustrated in FIG. 5 which shows for each carrier—in the bottom part—the signal-to-interference ratio (SIR) during the first iteration and—in the upmost part—the number of errors that occurred. Note however that from an information-theoretic viewpoint it is optimal that all users have identical power. To resolve the problem of error propagation, we use interference-dependent state insertion (SI). Essentially, by inserting additional state information on those carriers that suffer from a bad SIR, we can seriously decrease the probability of error propagation at a reasonable cost. Preferably State Insertion is applied in the (pc)SIC-OFDM/SDMA methods. The State Insertion method is further presented in a subcarrier by subcarrier approach but is not limited hereto.

First, the SIRs of user 1 for each subcarrier n are calculated from the knowledge of the equalizers $E_{LS}[s]$. Next, one additional state m is assigned to each of the M subcarriers $n_m$ that suffer most from SIR. These M states keep track of alternative estimates, called intermediate hard estimates in the above, $\tilde{x}M^1[m]$ for user 1. These are defined as the nearest constellation point to $\tilde{x}M^1[s_m]$ except for $\tilde{x}^1[s_m]$, which is the sliced version of $Ux[s_m]$. After these assignments the M additional states are treated as normal subcarriers to obtain $\tilde{x}M^u[s_m]$, successively for u=2 to U. In explicit, the MUI originating from user u−1 is reconstructed (after recombining with a channel response estimation) and subtracted (thereby modifying the original signal) according to Formula 12 and the soft estimates $\tilde{x}M^u[s_m]$ are computed by least-squares combining according to Formula 13. Finally, for each of those M subbands the algorithm selects from the intermediate hard estimates either $\tilde{x}^u[s_m]$ or $\tilde{x}M^u[s_m]$ as hard estimate if respectively the first or second of the 2-norms of Formula 13 is smallest.

$$\begin{bmatrix} y_{1_M}^u[m] \\ \vdots \\ y_{A_M}^u[m] \end{bmatrix} = \begin{bmatrix} y_{1_M}^{u-1}[m] \\ \vdots \\ y_{A_M}^{u-1}[m] \end{bmatrix} - \begin{bmatrix} h_{1_M}^{u-1}[s_m] \\ \vdots \\ h_{A_M}^{u-1}[s_m] \end{bmatrix} \tilde{x}_M^{u-1}[m] \quad \text{Formula 12}$$

$$\tilde{x}_M^u[m] = [e_1^u[s_m] \ \ldots \ e_A^u[s_m]] \cdot \begin{bmatrix} y_{1,M}^u[m] \\ \vdots \\ y_{A,M}^u[m] \end{bmatrix} \quad \text{Formula 13}$$

The State Insertion up link transmission method can be described as a method wherein said determining of said estimates of said data signals from said subband processed received data signals in said receiving terminal further comprising for at least one data signal (but not limited to one) the following steps: (first step) selecting from said data signals a selected data signal; (second step) determining a plurality of estimates of said selected data signal from said subband processed received data signals, said estimates are above denoted intermediate hard estimates; (third step) determining a plurality of modified subband processed received data signals, each of said modified subband processed received data signals being based on one of said (intermediate hard) estimates of said selected data signal. A recombination and modifier method are exploited here; (fourth step) determining a plurality of estimates of at least one of said remaining data signals from each of said plurality of modified subband processed received data signals, for instance via but not limited to least squares linear combination; (last step) and thereafter selecting one of said estimates of said selected data signal, for instance but not limited to evaluation of a norm of said modified subband processed received data signals.

In an embodiment of State Insertion uplink transmission method said determining of estimates (all steps) is performed on a subband by subband basis.

In an embodiment of the invention said State Insertion uplink transmission method is used in combination with Successive Interference Cancellation, preferably on a subband by subband basis.

Figure 6:
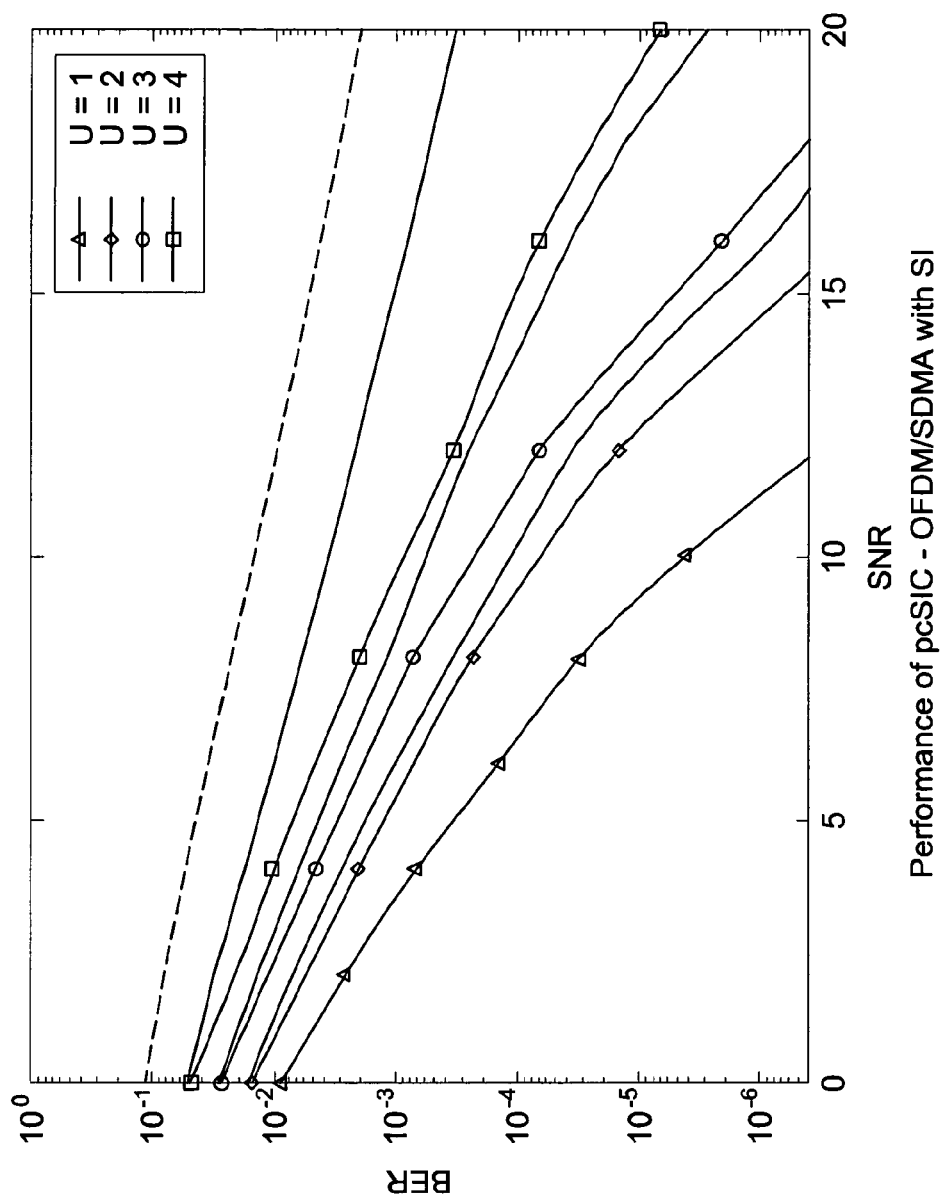
FIG. 6 shows the performance of pcSIC for uplink OFDM/SDMA with State Insertion for one to four simultaneous users. Said embodiment can be exploited for an arbitrary number of users. The Bit Error Rate (BER) is shown as function of the Signal to Noise Ration (SNR). Said determining of estimates of data signals from subband processed received data signals in said embodiment based on determining a plurality of estimates of a selected data signals, then accordingly modifying said subband processed received data signals, then determining estimates of at least one of the remaining data signals, being all the data signals except the selected data signal, and finally selecting one of said plurality of estimates of said selected data signal. Said selection of data signals approach results in introducing an ordering in which estimates of data signals will be determined. The amount of estimates to be determined per data signal can differ and can possibly be one for some data signals.

FIG. 6 shows the performance of pcSIC-OFDM/SDMA with interference-dependent state insertion for the exemplary system. The number of extra states was set to M=64. As a reference, the dashed curve gives the performance of single-user single-antenna 100 Mbps plain OFDM and the thin curves give the performance of pcSIC-OFDM/SDMA without state insertion. It shows that pcSIC-OFDM/SDMA with 64 additional states achieves a 6 dB gain at a BER of 0.001 and for four simultaneous users compared to pcSIC-OFDM/SDMA without SI. Other simulations also show that the performance improvement for SI with 32 and 16 states is respectively 5 dB and 4 dB.

For an estimation of the complexity of pcSIC-OFDM/SDMA with SI, the functionality can again be split in an initialization and a processing part. During initialization, each subcarrier's SIR after equalization needs to be computed, followed by state insertion for the M worst SIR subcarriers. During processing, M extra states need to be tracked using Formula 12 and 13, followed by selection based on the residual 2-norms of Formula 14.

$$\left\| \begin{array}{c} y_1^{U+1}[s_m] \\ \vdots \\ y_A^{U+1}[s_m] \end{array} \right\|_2 \text{ or } \left\| \begin{array}{c} y_{1M}^{U+1}[m] \\ \vdots \\ y_{A_M}^{U+1}[m] \end{array} \right\|_2 \qquad \text{Formula 14}$$

The operations required for state insertion of M out of N subcarriers are given in FIG. 11. To obtain the total number of operations for pcSIC-OFDM/SDMA with SI the operations from FIG. 10 have to be added to this. For the four-user four-antenna system, pcSIC-OFDM/SDMA with 64 additional states would require 220 kflops and 310 kdata-transfers during the initialization phase and 1.1 Gflops/sec and a data-transfer bandwidth of 2.6 Gwords/sec in the processing phase.

In the downlink transmission, the terminals of the composite peer are receiving signals and the processing peer is transmitting signals. The receiving terminals only dispose of a single antenna and a plain OFDM modem (i.e. without SDMA processing capabilities) in this embodiment. Since the user terminals have only a single antenna and since we want to concentrate most of the processing power in the basestation, they cannot mitigate multi-user interference in the downlink. Therefore, the basestation carries out a pre-compensation matrix $E_{PRE}$ on the datasymbol vector Y[s] to obtain $Y_{TR}[s]$, which is then transmitted on the A antennas. The input-output relation of Formula 6 is obtained.

Neglecting any non-idealities, this approach results in perfect separation of each user's datasymbols and perfect equalization upon reception. Therefore, no channel information or equalizer is needed in the mobiles. By applying these precompensation matrices for each carrier n, the input-output relation becomes as in Formula 15.

$$X[s] = H^T[s] \cdot E_{PRE}[s] \cdot Y[s] + N''[s] \qquad \text{Formula 15}$$
$$= I_{U \times U} \cdot Y[s] + N''[s]$$

Figure 7:
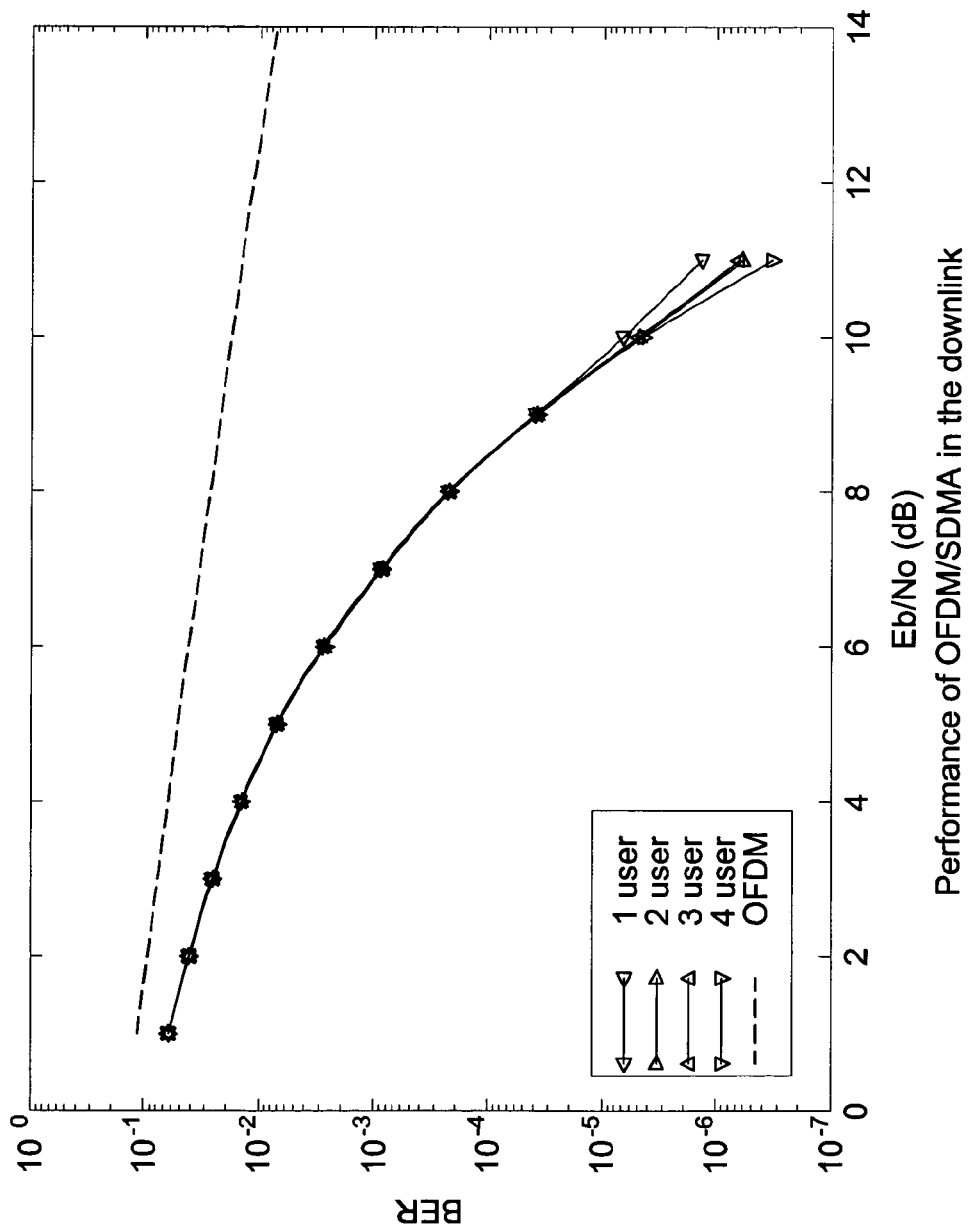
FIG. 7 shows the performance of downlink OFDM/SDMA for one to four simultaneous users. Said embodiment can be exploited for an arbitrary number of users. The Bit Error Rate (BER) is shown as function of the Signal toNoise Ratio (SNR).

Thus, each user sees a single-user AWGN channel per carrier. FIG. 7 shows the average BER in the downlink for different numbers of users. Since there is no interference, the number of simultaneous users does not influence performance (provided it does not exceed the number of antennas and no non-idealities occur).

The processing in the downlink again consists of both initialization and processing. In the initialization phase, the pre-compensation matrices are calculated. During the processing, the user data Y[s] is then multiplied with said pre-compensation matrices. The complexity for both initialization and processing is approximately the same as for the LS-OFDM/SDMA scheme in the uplink.

Figure 8:
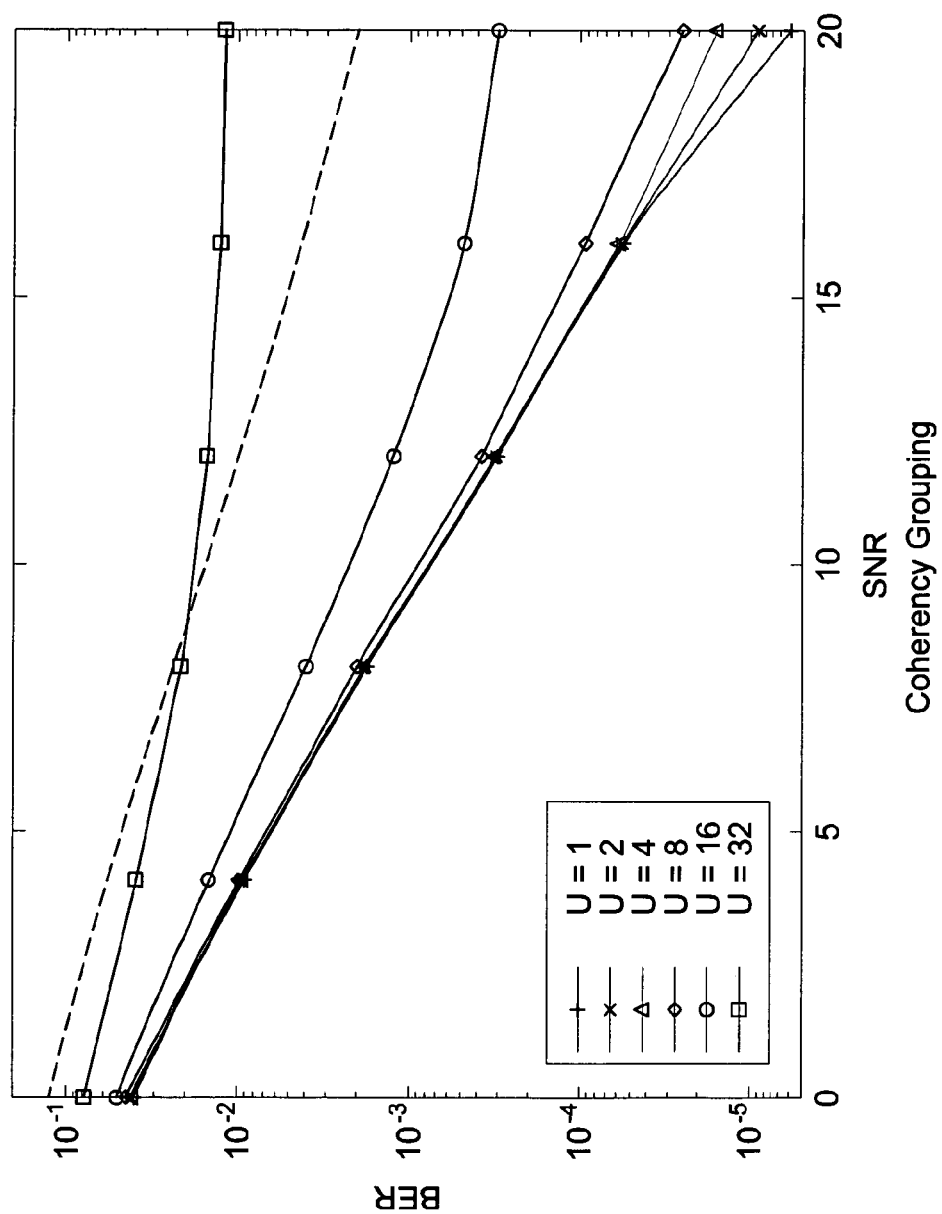
FIG. 8 shows the performance of uplink OFDM/SDMA for different coherence grouping factors. The Bit Error Rate (BER) is shown as function of the Signal to Noise Ration (SNR). In said embodiment the initialization, being the determining of relations between data signals and subband processed received data signals, is performed on a set-by-set basis. Said coherence grouping factor denote the amount of subbands in a set.

In addition to the proposed OFDM/SDMA techniques proposed for both uplink and downlink communication, the initialization effort in both situations can be simplified by applying coherence grouping. This initialization effort is characterized as determining the equalizer or the precompensation matrices, wherein Formulas 4, 5 or 7 are exploited. With said equalizer matrices relations between said data signals and subband processed received data signals are defined like in Formula 1, 9 or 13. With said precompensation matrices relations between said combined data signals, being transformed versions of said data signals, are defined like in Formula 6 or 15. Instead of determining said matrices for each subband separately, said subbands can be grouped into sets, at least one set comprising of at least two subbands and said matrices or more generally said relations can then be determined on a set-by-set basis. The groups are in an embodiment of this coherence grouping principle all of equal size G. FIG. 8 shows the performance degradation associated with carrier grouping applied to pcSIC-OFDM/SDMA with SI, for several values of G. It is observed that for the simulated channel the degradation is negligible for G smaller then or equal to 4. For G greater then or equal to 32, the performance becomes inferior to single-user single-antenna plain OFDM. We may conclude that for the system of interest the initialization complexity can be reduced with a factor 8. For the example of a 100 Mbps OFDM/SDMA WLAN that uses SDMA to separate four simultaneous 25 Mbps users, some numerical results for the performance gain and the complexity can be given. If pcSIC-OFDM/SDMA with 64-SI and a group size of eight is implemented, a performance gain of 11 dB is obtained at a BER of 0.001 compared to the least-squares approach. The required computational power is respectively 27 kflops and 40 kdata-transfers during initialization and 1.1 Gflops/sec and a data-transfer bandwidth of 2.6 Gwords/sec during processing.

In another preferred embodiment, the processing peer provides an access point to a connecting network (this connecting network can for example be a cable network or a satellite network), and the composite peer consists of wireless terminals for which cost is a major issue. In this embodiment, only the access point has DFT (Discrete Fourier Transform) and IDFT (Inverse Discrete Fourier Transform) processing means. This enables a cheap realization of both the digital baseband modem part of the terminals in the composite peer, and of the front-ends of all terminals in the system since a high peak-to-average power ratio of the transmitted signals is avoided. A typical application of asymmetric frequency domain SDMA could for example be a wireless home networking application in the 2.4 GHz band. Such an asymmetric configuration does implements a so-called concentrated scenario, wherein subband processing and inverse subband processing is located in the processing peer. In this transmission method the determination of estimates of said data signals from said subband processed received data signals in said receiving terminal comprising the following steps: (first step) determining intermediate estimates of said data signals from said subband processed received data signals in said receiving terminal; (second step) obtaining said estimates of said data signals by inverse subband processing said intermediate estimates. In this embodiment, the methods of the invention can be used not only to detect the signals of different terminals transmitting simultaneously in the same frequency band, but for example also to mitigate the interference from a microwave oven causing disturbance signals in the band. In multipath fading environment, such as for example home environments, guard intervals can be inserted in the data signals prior to transmission. If these guard intervals are again designed to comprise all the echoes received on the multipath channel, the channel convolution becomes cyclic after removal of the guard intervals. Thus, in the frequency-domain it becomes equivalent to multiplication with the Fourier transform of the channel. This embodiment allows cheap terminals in the processing peer and can implement uplink as well as downlink combinatory processing, in a way similar as OFDM/SDMA, including successive interference cancellation, preferably per subband and state insertion.

What is claimed is:

1. A method of transmitting data signals from at least two transmitting terminals, with each having at least one transmitting means, to at least one receiving terminal having a spatial diversity receiving means, the method comprising:
   transmitting from the transmitting terminals transformed data signals, being transformed versions of respective data signals, wherein spectra of the transformed data signals are at least partly overlapping;
   receiving on the spatial diversity means received data signals, wherein the received data signals are each a function of one of the transformed data signals;
   subband processing of the received data signals in the receiving terminal; and
   determining estimates of the respective data signals, on a subband by subband basis, from the subband processed received data signals in the receiving terminal, wherein said determining includes, for at least one data signal:
   selecting from the data signals a selected data signal;
   determining an estimate of the selected data signal from the subband processed received data signals;
   modifying the subband processed received data signals based on the estimate of the selected data signal; and
   determining estimates of the remaining data signals from the modified subband processed received data signals.

2. The method of claim 1, wherein the transmitting is substantially simultaneous.

3. The method of claim 1, wherein selecting a data signal is based on the receiving power of the data signals.

4. The method of claim 1, wherein selecting a data signal is based on the interference ratio of the data signals.

5. The method of claim 1, wherein selecting a data signal is based on the interference ratio of the data signals.

6. The method of claim 1, wherein the subbands, being involved in the subband processing, are grouped into sets, at least one set comprising at least two subbands; and wherein determining the estimates of the data signals in the receiving terminal comprises:
   determining relations between the data signals and subband processed received data signals on a set-by-set basis; and
   exploiting the relations between the data signals and the subband processed received data signals for determining the data signals.

7. The method of claim 1, wherein the transformation of the data signals to transformed data signals comprises inverse subband processing.

8. The method of claim 1, wherein determining estimates of the data signals from subband processed received data signals in the receiving terminal comprises:
   determining intermediate estimates of the data signals from the subband processed received data signals in the receiving terminal; and
   obtaining the estimates of the data signals by inverse subband processing the intermediate estimates.

9. The method of claim 1, wherein the transformation of the data signals to transmitted data signals further comprises guard interval introduction.

10. The method of claim 1, wherein the subband processing comprises orthogonal frequency division demultiplexing.

11. The method of claim 7, wherein the inverse subband processing comprises orthogonal frequency division multiplexing.

12. The method of claim 1, wherein the determining of the data signals is essentially based on the distinct spatial signatures of the received data signals.

13. A method of transmitting data signals from a transmitting terminal having a spatially diverse transmitting means comprising at least two transmitting means to at least two receiving terminals, the method comprising:
   providing at least two data signals at the transmitting terminal;
   determining at least two combined data signals in the transmitting terminal, the combined data signals each being transformed versions of the data signals, wherein the combined data signals are adapted for facilitating estimation of the data signals by the receiving terminals;
   inverse subband processing each of the combined data signals;
   transmitting one of the inverse subband processed combined data signals from each of the at least two transmitting means, wherein said inverse subband processed combined data signals form a different composite data signal at each of said at least two receiving terminals;
   receiving at each receiving terminal one of a plurality of composite data signals; and
   determining at each receiving terminal an estimate of the data signal intended for the respective receiving terminal from the respective received composite data signal.

14. The method of claim 13, wherein the transmitting of said inverse subband processed combined data signals from said at least two transmitting means is substantially simultaneous.

15. The method of claim 13, wherein the spectra of the inverse subband processed combined data signals are at least partly overlapping.

16. The method of claim 13, wherein determining the at least two combined data signals in the transmitting terminal is determined on a subband by subband basis.

17. The method of claim 15, wherein determining the estimates of the data signals in the receiving terminals comprises subband processing.

18. The method of claim 13, wherein determining combined data signals in the transmitting terminal comprises:
determining intermediate combined data signals by subband processing the data signals; and
determining the combined data signals from the intermediate combined data signals.

19. The method of claims 17, wherein the subband processing is orthogonal frequency division demultiplexing.

20. The method of claim 13, wherein the inverse subband processing is orthogonal frequency division multiplexing.

21. The method of claim 13, wherein the subbands, being involved in inverse subband processing, are grouped into sets, at least one set comprising at least two subbands; and wherein determining combined data signals in the transmitting terminal comprises:
determining relations between the data signals and the combined data signals on a set-by-set basis; and
exploiting the relations between the data signals and the combined data signals for determining the data signals.

22. The method of claim 13, wherein in the inverse subband processed combined data signals a guard interval is introduced.

23. The method of claim 13, wherein the determining of combined data signals is essentially based on the distinct spatial signatures of the transmitted inverse subband processed combined data signals.

24. An apparatus for determining estimates of data signals, the apparatus comprising:
at least one spatial diversity receiving means comprising at least two receiving means;
circuitry for receiving a data signal on each of the at least two receiving means, wherein the data signals received on the at least two receiving means are each a function of a transmitted signal and characteristics of the data signals define a spatial signature of the data signals;
circuitry for subband processing, on a subband by subband basis, the data signals received on each of the at least two receiving means; and
circuitry for determining estimates of the data signals from the subband processed received data signals.

25. The apparatus of claim 24 wherein the circuitry is arranged for determining estimates of the data signals from subband processed received data signals and comprises a plurality of circuits each being arranged for determining part of the estimates of the data signals based on part of the subbands of the subband processed received data signals.

26. The apparatus of claim 24, wherein the spatial diversity means comprises at least two receiving means and the circuitry is arranged for receiving the received data signals with the spatial diversity means and comprises a plurality of circuits each being arranged for receiving the received data signals from one of the receiving means of the spatial diversity means.

27. The apparatus of claim 24, wherein the determining of the data signals is essentially based on the distinct spatial signatures of the received data signals.

28. An apparatus for transmitting a plurality of data signals to a plurality of terminals, the apparatus comprising:
circuitry for combining a plurality of data signals to create two combined data signals, wherein the combined data signals are adapted for facilitating estimation of the plurality of data signals respectively intended for each of a plurality receiving terminals;
circuitry for inverse subband processing the combined data signals; and
at least two spatial diverse transmitting means configured to transmit respective inverse subband processed combined data signals to at least two receiving terminals, wherein said inverse subband processed combined data signals form a composite data signal at each of said plurality of terminals.

29. The apparatus of claim 28, wherein the combining circuitry comprises a plurality of circuits each being adapted for combining data signals based on part of the subbands of the data signals.

30. The apparatus of claim 28, wherein the spatial diversity transmitting means comprises at least two transmitting means adapted for transmitting inverse subband processed combined data signals; the transmitting means further comprises a plurality of circuits each being adapted for transmitting the inverse subband processed combined data signals with one of the transmitting means of the spatial diversity means.

31. The apparatus of claim 28, wherein the spectra of the inverse subband processed combined data signals are at least partly overlapping.

32. The apparatus of claim 28, wherein the combining of data signals is essentially based on the distinct spatial signatures of the transmitted inverse subband processed combined data signals.

33. The apparatus of claim 28, wherein determining combined data signals are on a subband by subband basis.

34. A method of transmitting data signals from at least two transmitting terminals with each at least one transmitting means to at least one receiving terminal with a spatial diversity receiving means comprising:
transmitting from the transmitting terminals transformed data signals, being transformed versions of the data signals, wherein spectra of the transformed data signals are at least partly overlapping;
receiving on the spatial diversity means received data signals being at least function of at least two of the transformed data signals;
subband processing of at least two of the received data signals in the receiving terminal; and
determining estimates of the data signals, on a subband by subband basis, from subband processed received data signals in the receiving terminal, wherein determining the estimates of the data signals comprises:
selecting from the data signals a selected data signal;
determining a plurality of estimates of the selected data signal from the subband processed received data signals;
determining a plurality of modified subband processed received data signals, each of the modified subband processed received data signals being based on one of the estimates of the selected data signal;
determining a plurality of estimates of at least one of the remaining data signals from the plurality of modified subband processed received data signals; and
thereafter selecting one of the estimates of the selected data signal.

35. The method of claim 34, wherein selecting a data signal is based on the receiving power of the data signals.

36. The method of claim 34, wherein selecting a data signal is based on the interference ratio of the data signals.

37. The method of claim 34, wherein selecting a data signal is based on the interference ratio of the data signals.

38. A method of transmitting data signals from at least two transmitting terminals with each at least one transmitting means to at least one receiving terminal with a spatial diversity receiving means comprising:
- transmitting from the transmitting terminals at least two transformed data signals, the transformed data signals being transformed versions of the data signals;
- receiving on the spatial diversity means received data signals being at least function of at least two of the transformed data signals;
- subband processing of at least two of the received data signals in the receiving terminal;
- determining intermediate estimates of the data signals from the subband processed received data signals in the receiving terminal; and
- obtaining estimates of the data signals by inverse subband processing the intermediate estimates.

39. The method of claim 38, wherein the determining of the data signals is essentially based on the distinct spatial signatures of the received data signals.

40. The method of claim 13, wherein the combined data signals are adapted to separate each receiving terminals' data symbols so that each respective receiving terminal may determine an estimation of the data signal intended for each respective receiving terminal.

41. A system for transmitting data signals from at least one transmitting terminal having a spatial diversity transmitting means to at least two receiving terminals each having at least one receiving means comprising:
- means for determining intermediate combined data signals by subband processing the data signals;
- means for determining the combined data signals from the intermediate combined data signals, the combined data signals being transformed versions of the data signals, wherein the combined data signals are adapted for facilitating estimation of the data signals by said receiving terminals;
- means for inverse subband processing the combined data signals;
- means for transmitting with the spatial diversity transmitting means said inverse subband processed combined data signal;
- means for receiving on at least one of the receiving means of at least one of the receiving terminals an inverse subband processed received data signals, being at least function of the inverse subband processed combined data signals; and
- means for determining at said at least one of the receiving means estimates of the data signals intended for said at least one of the receiving means from the inverse subband processed received data signals.

* * * * *